(12) United States Patent
Reed et al.

(10) Patent No.: US 11,474,044 B2
(45) Date of Patent: Oct. 18, 2022

(54) DEVICE AND METHODS FOR DETERMINATION OF MOLECULAR WEIGHT DISTRIBUTIONS OF POLYMERS AND DISTRIBUTIONS OF OTHER POLYMER PROPERTIES WITHOUT PHYSICAL SEPARATION

(71) Applicants: ADVANCED POLYMER MONITORING TECHNOLOGIES, INC., New Orleans, LA (US); THE ADMINISTRATORS OF THE TULANE EDUCATIONAL FUND, New Orleans, LA (US)

(72) Inventors: Wayne Frederick Reed, New Orleans, LA (US); Rick D. Montgomery, New Orleans, LA (US); Michael Felix Drenski, New Orleans, LA (US); Aide Wu, New Orleans, LA (US)

(73) Assignees: ADVANCED POLYMER MONITORING TECHNOLOGIES, INC., New Orleans, LA (US); THE ADMINISTRATORS OF THE TULANE EDUCATIONAL FUND, New Orleans, LA (US)

( * ) Notice: Subject to any disclaimer, the term of this patent is extended or adjusted under 35 U.S.C. 154(b) by 440 days.

(21) Appl. No.: 16/094,542

(22) PCT Filed: Apr. 21, 2017

(86) PCT No.: PCT/US2017/028919
§ 371 (c)(1),
(2) Date: Oct. 18, 2018

(87) PCT Pub. No.: WO2017/185019
PCT Pub. Date: Oct. 26, 2017

(65) Prior Publication Data
US 2019/0128812 A1 May 2, 2019

Related U.S. Application Data

(60) Provisional application No. 62/325,847, filed on Apr. 21, 2016.

(51) Int. Cl.
*G01N 21/75* (2006.01)
*B01J 19/00* (2006.01)
*C08F 20/56* (2006.01)

(52) U.S. Cl.
CPC .......... *G01N 21/75* (2013.01); *B01J 19/0006* (2013.01); *C08F 20/56* (2013.01);
(Continued)

(58) Field of Classification Search
CPC . G01N 21/75; B01J 19/0006; B01J 2219/002; B01J 2219/00186;
(Continued)

(56) References Cited

U.S. PATENT DOCUMENTS

| 5,392,044 A | 2/1995 | Kotzin et al. |
| 2011/0222637 A1* | 9/2011 | Davey ..................... H03K 5/08 375/346 |

FOREIGN PATENT DOCUMENTS

WO 2016/054138 A1 4/2016

OTHER PUBLICATIONS

International Search Report and Written Opinion dated Aug. 2, 2017 in corresponding International Patent Application No. PCT/US2017/028919, 8 pages.

* cited by examiner

*Primary Examiner* — Natalie Huls
*Assistant Examiner* — Michael J Singletary
(74) *Attorney, Agent, or Firm* — Polsinelli PC

(57) ABSTRACT

Devices and methods for determining the cumulative distribution of a polymer property in a reactor without physical separation of reaction subcomponents. The device includes a means of measuring an instantaneous property of the polymers being produced in a reaction vessel a plurality of times during a polymerization reaction as well as a means of (Continued)

determining the corresponding change in polymer concentration in the reaction vessel between measurements of the instantaneous polymer property The device also includes a means of computing a statistical distribution appropriate to the polymer characteristic and applying the statistical distribution to a recently measured instantaneous value of the polymer property so as to have an instantaneous distribution of the polymer property and a means of adding together the instantaneous distributions of the polymer property in order to obtain the cumulative distribution of the polymer property in the reactor.

22 Claims, 29 Drawing Sheets

(52) U.S. Cl.
CPC .................. *B01J 2219/002* (2013.01); *B01J 2219/00186* (2013.01); *B01J 2219/00218* (2013.01); *B01J 2219/00231* (2013.01); *C08F 2400/02* (2013.01)

(58) Field of Classification Search
CPC ... B01J 2219/00231; B01J 2219/00218; C08F 20/56; C08F 2400/02
See application file for complete search history.

DEVICE AND METHODS FOR DETERMINATION OF MOLECULAR WEIGHT DISTRIBUTIONS OF POLYMERS AND DISTRIBUTIONS OF OTHER POLYMER PROPERTIES WITHOUT PHYSICAL SEPARATION

CROSS-REFERENCE TO RELATED APPLICATIONS

This application is a National Stage of International Application No. PCT/US2017/028919, entitled "Device and Methods for Determination of Molecular Weight Distributions of Polymers and Distributions of Other Polymer Properties without Physical Separation," filed on Apr. 21, 2017, which claims the benefit of U.S. Provisional Application No. 62/325,847, entitled "Device and Methods for Determination of Molecular Weight Distributions of Polymers and Distributions of Other Polymer Properties without Physical Separation," filed on Apr. 21, 2016, each of which are incorporated by reference in their entirety, for all purposes, herein.

GOVERNMENT LICENSE RIGHTS

The subject-matter of the present disclosure was made in part with government support under DE-EE0005776, awarded by the U.S. Department of Energy. The government has certain rights in the subject-matter of the present disclosure.

FIELD

The present application is directed to determining the molecular weight distribution of a polymer. Specifically, the present disclosure is directed to determination of the molecular weight distribution of a polymer during polymer production.

BACKGROUND

The molecular weight distribution (MWD) of a polymer plays a dominant role in a polymer's properties, such as processability, strength, and elastic moduli, and is hence one of the most important characteristics determining the quality and applicability of a given polymeric product. Determination of the molecular weight distribution (MWD) of polymers generally requires separation of the sub-components by physical methods, such as chromatography, field flow fractionation, mass spectroscopy, or electrophoresis, usually after the polymer has been produced. The application of separation methods to industrial reaction environments has generally been unsuccessful.

BRIEF SUMMARY

In one aspect, a method may include monitoring an instantaneous average property of polymers-being produced by a polymerization reaction occurring in a reaction vessel a plurality of times during the polymerization reaction. The method may also include determining a corresponding change in polymer concentration in the reaction vessel based at least in part on successive values of the instantaneous average property of the polymers. The method may also include computing an instantaneous polymer property distribution corresponding to the most recently instantaneous average property using a statistical distribution. The method may further include adding together the instantaneous polymer property distributions with their amplitude proportional to the change in polymer concentration between successive values of instantaneous average polymer property, in order to obtain a cumulative polymer property distribution up to the latest value of the instantaneous average polymer property and change in polymer concentration. The cumulative polymer property distribution is determined without physically separating the polymers.

In another aspect, a method may include monitoring an instantaneous-weight average molecular weight ($M_{w,inst}$) of polymers being produced by a polymerization reaction occurring in a reaction vessel a plurality of times during the polymerization reaction. The method may also include determining a corresponding change in polymer concentration $\Delta C_p$ in the reaction vessel based at least in part on successive values of the instantaneous weight average molecular weight. The method may also include generating an instantaneous molecular weight distribution (IMWD) at the change in the polymer concentration $\Delta C_p$ by using the instantaneous weight average molecular weight as the mean for the IMWD. The method may also include computing a histogram of instantaneous weight average molecular weight distributions (IMWDs), with the amplitude of the IMWDs proportional to the change in polymer concentration between successive values of instantaneous weight average molecular weight. The method may further include computing a cumulative molecular weight distribution (CMWD) based on the histogram using a statistical distribution appropriate to the polymerization reaction. The cumulative molecular weight distribution is determined without physically separating the polymer population.

In another aspect, a device may include a means of monitoring an instantaneous weight average molecular weight of polymers being produced in a reaction vessel a plurality of times during a polymerization reaction. The device may also include a means of determining the corresponding change in polymer concentration in the reaction vessel between values of the instantaneous weight average molecular weight. The device may also include a means of computing an instantaneous molecular weight distribution corresponding to a recently instantaneous weight average molecular weight and applying the statistical distribution to a recent value of the polymer property to obtain the instantaneous molecular weight distribution of the polymer property. The device may also include a means of adding together each instantaneous molecular weight distribution of the polymer property to obtain a cumulative molecular weight distribution. Each instantaneous weight average molecular weight that is added is weighted by the polymer concentration interval produced since the previous instantaneous weight average molecular weight. The cumulative molecular weight distribution is determined without physically separating the polymers.

In a further aspect, a system may include a reactor configured to contain at least one polymer produced by a polymerization reaction. The system may also include a measuring device coupled with the reactor, the measuring device configured to monitor an instantaneous average property of the at least one polymer in the reactor. The system may also include a computational device coupled with the measuring device, the computational device configured to compute a cumulative polymer property distribution based on the instantaneous average property. The system may further include a controller communicatively coupled with the computational device and further coupled with the reactor, the controller configured to manipulate at least one reactor control variable based on the cumulative polymer property distribution to obtain a predetermined, final cumulative polymer property distribution for the end product. The cumulative polymer property distribution is determined without physically separating the at least one polymer.

BRIEF DESCRIPTION OF THE DRAWINGS

Embodiments of the present application are described, by way of example only, with reference to the attached Figures, wherein.

Figure 1:
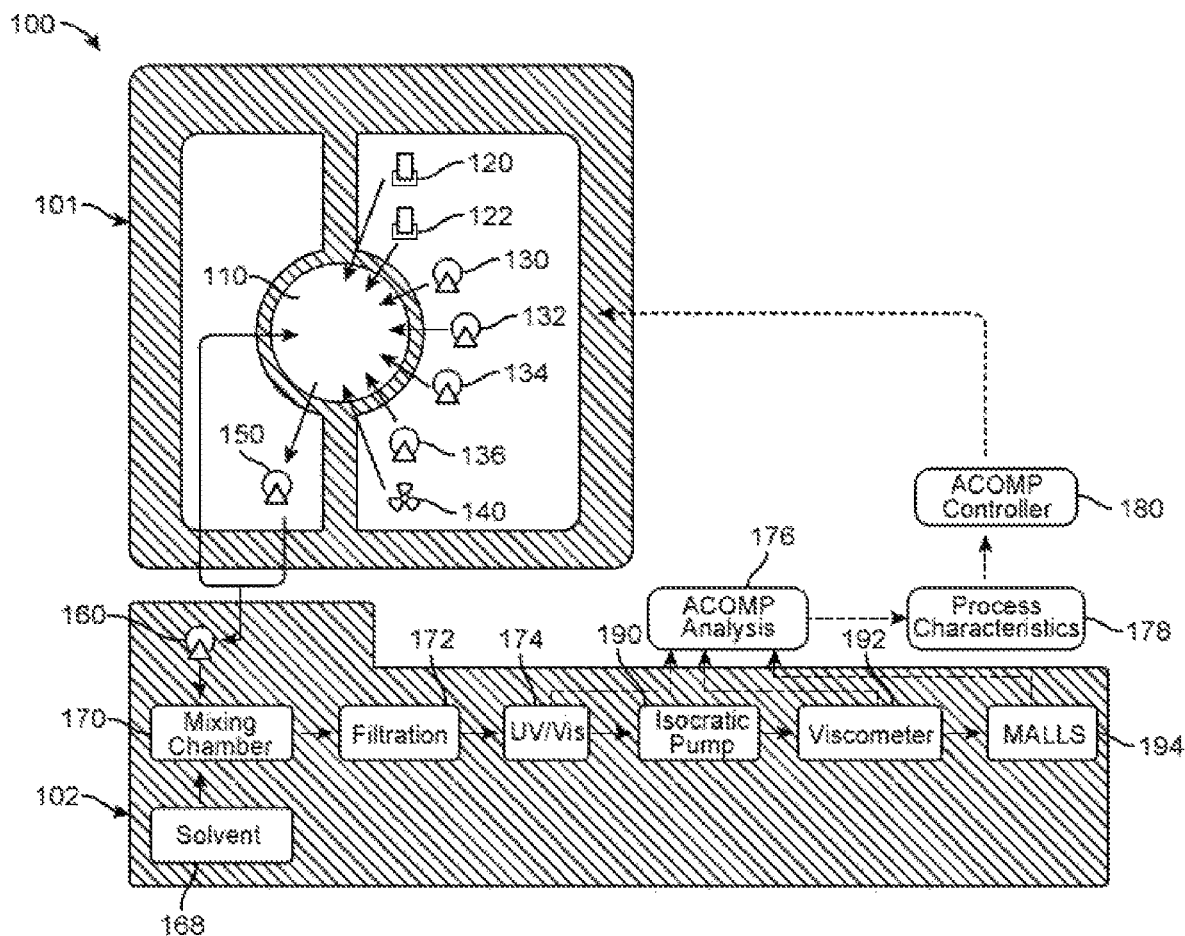
FIG. 1 is an illustration depicting an ACOMP unit, according to an example embodiment of the present disclosure.

It should be understood that the various aspects are not limited to the arrangements and instrumentality shown in the drawings.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented. The term "coupled" is defined as connected, whether directly or indirectly through intervening components, and is not necessarily limited to physical connections. The term "communicatively coupled" is defined as connected, either directly or indirectly through intervening components, and the connections are not necessarily limited to physical connections, but are connections that accommodate the transfer of data between the so-described components. The connections can be such that the objects are permanently connected or releasably connected. The terms "comprising," "including" and "having" are used interchangeably in this disclosure. The terms "comprising," "including" and "having" mean to include, but are not necessarily limited to, the things so described.

The present disclosure provides for determination of MWD during polymer production by using a device capable of monitoring the instantaneous molecular weight $M_{w,inst}$ of a polymer population, as it is produced by chemical or biochemical synthesis, together with the change in polymer concentration in the reaction vessel. This is achieved by i) use of $M_{w,inst}$ as the defining parameter for the instantaneous MWD (IMWD), ii) selection of the distribution for the type of polymerization reaction occurring, and iii) accumulating the IMWD into an evolving cumulative MWD (CMWD), where each IMWD that is added to the CMWD is weighted by the polymer concentration interval produced since the previous IMWD. Hence, the CMWD is available at every moment of the polymerization reaction, and the final CMWD at the end of the reaction is the end-product CMWD. In this sense separation of the polymer population occurs in time, during synthesis, rather than a physical separation method on the endproduct. The advantages of this separation-free approach include i) The ability to monitor the evolution of the MWD while a polymerization reaction is occurring, ii) the ability to control polymer synthesis reactions as they occur so as to arrive at a final, desired CMWD, and iii) knowledge of the final CMWD eliminates the need for post-polymerization determination of CMWD; i.e. the polymer end-product CMWD is already known by the end of the reaction without any further analysis. The approach can also be used to generate instantaneous and cumulative intrinsic viscosity distributions when intrinsic viscosity is monitored in time, and instantaneous and cumulative copolymer distributions, when these are measured in time. The present disclosure avoids the need for delicate, problematic and expensive separations instrumentation at industrial reactors.

Automatic Continuous Online Monitoring of Polymerization reactions (ACOMP) allows control of reaction kinetics, reduced viscosity, and molecular weight, using initiator and monomer feeds into the reactor, as well as other agents such as chain transfer agents, cross-linking and branching agents, inhibitors, and quenchers, in addition to temperature. In achieving this type of control, variables measured by ACOMP such as polymer and monomer concentration, $M_w$, reduced viscosity and $M_{w,inst}$ and instantaneous reduced viscosity are used and manipulated by the above listed control agents to follow a desired reaction trajectory.

FIG. 1 illustrates an exemplary ACOMP unit 100, according to an example embodiment of the present disclosure. The ACOMP unit 100 includes an ACOMP reactor control interface 101 and an ACOMP analysis control interface 102. In at least some instances, the ACOMP reactor control interface 101 and the ACOMP analysis control interface 102 are controlled by a Programmable Logic Controller (PLC) control system (not shown) which is coupled to a computing device (not shown). The computing device can be a desktop or laptop computer, a smartphone, a tablet, or any other similar device. The computing device can allow for visualization and control of process control variables and components of the ACOMP unit 100.

The ACOMP reactor control interface 101 can control various components of the ACOMP unit 100. One component is a reactor 110. The reactor 110 may be any reactor capable of containing a sample, such as a polymer solution, or a solution undergoing a reaction, including but not limited to polymerization. The ACOMP unit 100 may further include a mixer 140 that may be located outside of the reactor 110 and be capable of mixing samples contained in reactor 110. ACOMP unit 100 may further include flow controllers 120, 122 capable of delivering gases into reactor 110. As depicted in FIG. 1, ACOMP unit 100 may further include pumps 130, 132, 134 capable of delivering solutions or liquids to reactor 110. The reactor 110 and contents contained therein can also be subjected to heating or cooling from temperature controller 136. Reactor 110 may also be coupled with a recycle pump 150 coupled with a bottom portion of reactor 110 via a drain port (not shown) and a ball valve (not shown). Reactor 110 contents can be continuously extracted through the recycle pump 150 and recycled back into the top of the reactor 110. An extraction pump 160 connects the ACOMP system interface 102 to the reactor control interface 101 via the recycle pump 150.

As depicted in FIG. 1, the extracted reactor contents may be combined with a flow of quenching solvent from solvent source 168. Once the reactor contents are combined with the quenching solvent, the combination may be passed by inert propylene tubing to a dynamic mixing chamber 170. The mixing chamber 170 can be used to actively stir and combine the two continuous streams of reactor contents and solvent into one homogeneous mixture. After the homogenous solution leaves the mixing chamber, it may be passed through a filtration system 172 to remove any particulate or gel matter that may have been removed from the reaction 110 with the reactor contents. The filtered homogeneous solution can then be flowed through one or more inline analytical detectors such as a UV/Visible absorption spectrometer 174. A fraction of the sample stream may be diverted by pump 190 to one or more viscometers 192 and a Multi Angle Laser Light Scattering (MALLS) detector 194. The ACOMP unit 100 includes an on-board analysis package 176 capable of analyzing data obtained by detectors 174, 192, 194. The analysis package 176 may in some instances respond to manual operation triggers through interface with Automation and Control software. These triggers instruct the analysis software to perform key analysis algorithms appropriate to each step or phase in the polymer reaction process. Process characteristics 178 may be determined based on the analysis carried out by the analysis package 176.

The ACOMP unit 100 may further include a process controller 180 coupled with the ACOMP reactor control interface 101 and the ACOMP analysis control interface 102 to provide a means by which the user can interact with the ACOMP reactor control interface 101 to perform the operations that may control or influence polymer reactions in reactor 110.

Instantaneous weight average molecular weights $M_{w,inst}$ (t) can be obtained from the cumulative $M_w(t)$, directly measured using ACOMP when scattering and concentration detection are employed. See W. F. Reed, "A Method for Online Determination of Polydispersity during Polymerization Reactions", Macromolecules, 33, 7165-7172, 2000. Since polymer concentration $C_p$ is monitored by ACOMP, $M_{w,inst}$ can be determined for both batch and semi-batch reactions by $$M_{w,inst} = \frac{d(C_p M_w)}{dC_p}. \qquad (1)$$

From the $M_{w,inst}$ determinations, a histogram of the MWD based on $M_{w,inst}$ can be built up as a reaction proceeds. The histogram approach was first demonstrated by W. F. Reed (2000) and specific distribution models were used to predict the evolution of the usual polydispersity indices $M_w/M_n$ and $M_z/M_w$. See W. F. Reed, "A Method for Online Determination of Polydispersity during Polymerization Reactions", Macromolecules, 33, 7165-7172, 2000. That work did not, however, fold the histogram representations with the specific distributions to obtain a complete MWD, nor did it anticipate summing of instantaneous distributions, weighted by the increment of polymer concentration increase between measurements to obtain a cumulative MWD. The use of the $M_{w,inst}$ and the histogram method, were revisited in subsequent publications from the same research group. See, for example, A. Giz, H. Giz, J. L. Brousseau, A. Alb, and W. F. Reed, "Kinetics and Mechanism of Acrylamide Polymerization by Absolute, Online Monitoring of Polymerization Kinetics", Macromolecules, 34, 5, 1180-1191, 2001; Alina M. Alb, Michael F. Drenski, Wayne F. Reed, "Simultaneous continuous, non-chromatographic monitoring and discrete chromatographic monitoring of polymerization reactions", J. Appl. Polym. Sci., 13, 190-198, 2009.

As used herein, the use of the word 'instantaneous' in connection with properties such as molecular weight, reduced and intrinsic viscosity, composition, concentration, and distribution, can refer to one of the following three situations: 1) If a value is measured directly at discrete time intervals, such as concentration weight average molecular weight, comonomer composition, or reduced viscosity then the 'instantaneous' value refers to the value at the time of the discrete measurement; e.g., ACOMP measurements are typically made once a second, although this is not limiting, since much faster and much slower rates can be used; 2) If an analytical functional form corresponds to the property in question, then the value of the function at any given time is the 'instantaneous' value, or if one or more derivatives of any such analytical functions, or combination of analytical functions, are taken then the values of the one or more derivatives at any given time is the 'instantaneous' value of the one or more derivatives; 3) If data points are averaged over an interval of time which is short compared to the time of the entire polymerization process, then the average value over the interval is considered the 'instantaneous' value, or, if one or more derivatives is taken over such an interval, whether through, for example, averaging, fitting, filtering, or regression, then the value of the each of one or more derivatives over the interval is considered to be the 'instantaneous' value. According to at least one aspect of the present disclosure, if an interval is one twentieth of the reaction period, then measurements made over this interval can be considered 'instantaneous'. It is important to note that, although conditions 1, 2, and 3, above, were formulated in terms of time intervals, the exact same meaning of 'instantaneous' will apply if some other variable is used to measure the interval. An important non-limiting case is the use of intervals corresponding to increases in polymer concentration instead of increases in time.

The ability to determine a complete MWD during a polymerization reaction, according to the presently disclosed methods and techniques, was unexpected. The presently disclosed methods and techniques do not fold a histogram with specific distributions at the end of a reaction. Rather, at each measured instant during a monitored polymerization reaction, the presently disclosed method accepts each value of $M_{w,inst}$ and the corresponding change in amount of polymer concentration in the reactor $C_p$ and creates an Instantaneous Molecular Weight Distribution (IMWD). One reason that the presently disclosed method was not anticipated was that, previously, realtime analysis of incoming raw light scattering, spectroscopic, viscometric and other data was not available so the $M_{w,inst}$ method could not be used.

According to at least one aspect of the present disclosure, measurements of $M_{w,inst}$, or other molecular weight average, may be combined with chosen distributions to produce complete, continuous MWD that closely resemble those produced by actual chromatographic separation of polydisperse polymers, such as by Gel Permeation Chromatography (GPC), also termed Size Exclusion Chromatography (SEC), or MALDI-TOF. While W. F. Reed (2000) made use of chosen distributions to obtain averages of the MWD it neither carried out nor contemplated the folding of the histograms with the chosen distributions to obtain the MWD resembling actual chromatographic separations, nor did it anticipate the concept of IMWD accumulating into a CMWD. See W. F. Reed, "A Method for Online Determination of Polydispersity during Polymerization Reactions", Macromolecules, 33, 7165-7172, 2000. According to the presently disclosed method, the 'separation' mechanism for determining MWD is time; i.e. ACOMP is able to determine, via $M_{w,inst}$, the latest increment to the MWD as it is added to the evolving polymer population.

The ability to produce chromatography-free complete MWDs using ACOMP is potentially a disruptive technology. Current practice is to determine MWD distributions post-polymerization, or by discrete aliquots during polymerization, normally using GPC. The presently disclosed method allows for this chromatography-free approach because it furnishes $M_{w,inst}$ continuously during polymer synthesis reactions and hence, by using appropriately chosen distributions, the presently disclosed method furnishes a continuous record of MWDs during synthesis, including the MWD of the final polymeric product. This means that difficult to use and maintain GPC systems would no longer be needed for product quality control and specification matching, and that polymeric products would be 'born' with the MWD already characterized. One reason that this capability has not appeared until now is that it requires frequent, virtually continuous, measurement of the polymer $M_w(t)$ during polymerization, which no method, except ACOMP, until now has been able to reliably furnish. Online GPC, in the relatively few cases where it has been achieved, relies on chromatographic separation to determine MWD at discrete intervals.

The main reason online GPC has not found widespread applicability for polymerization monitoring is i) obtaining diluted, conditioned samples is a major problem and is usually performed manually, and ii) chromatographic instrumentation is complex and subject to frequent instabilities and malfunctions and requires intensive maintenance. In fact, the standard practice in industrial polymer production is to have a technician manually sample the reactor at intervals, bring the sample to an analytical laboratory where GPC and other tests, such as Mooney viscosity, are made.

ACOMP solves both of the above problems by i) producing automatically and continuously a diluted sample stream of analytical grade and ii) eliminating chromatography as a necessary means of characterizing the polymer, resulting in continuous, quantitative characterization of the polymerization reaction in terms of kinetics, monomer and comonomer conversion, $M_w(t)$, $M_{w,inst}(t)$, cumulative and instantaneous intrinsic viscosity and other parameters. The presently disclosed method extends the power of ACOMP by using these uniquely available instantaneous average quantities to construct IMWD and accumulate them into CMWD.

The presently disclosed method also represents a point of confluence between the heretofore model-free approach at the heart of ACOMP monitoring and interpretation and the growing use of models, primarily from the Chemical Engineering community, as ACOMP is adapted to active control of polymer production. A significant strength of ACOMP is that it delivers primary quantities such as kinetics, conversion, average composition drift, reduced viscosity, and $M_w$ by means independent of empirical or inferential modeling. The fact that that ACOMP makes measurements 'based on quantities related to constants of nature'—such as the fundamental absorption and scattering interaction of electromagnetic radiation and matter (which also subsumes refractivity)—has set it apart from the many inferential model based methods used in the polymer science and chemical engineering community.

Now, however, as ACOMP becomes more integrated with control theory and practice, the model-based perspective from the chemical engineering community is taking a larger role in the use of ACOMP for fully automated, feedback control of polymer manufacturing. In fact, computational science, based on modeling, has made inroads in almost every physical, life, and social science, including tremendously complex areas such as climate modeling. Given this widespread acceptance of modeling, it is now propitious to fully develop the determination of chromatography-free MWD from ACOMP. A further factor impelling this initiative is the tremendous technical advances made in ACOMP over the past few years, due in large part to pioneer engineering by Advanced Polymer Monitoring Technologies, Inc. The new generation of professionally engineered ACOMP instrumentation and software allows realtime computations of all characteristics, such as $M_w$, $M_{w,inst}$, and intrinsic viscosity, that were previously analyzed post-polymerization.

The present disclosure represents the first formal hybridization of ACOMP's heretofore model-free approach with well accepted models for molecular weight distributions.

Figure 2:
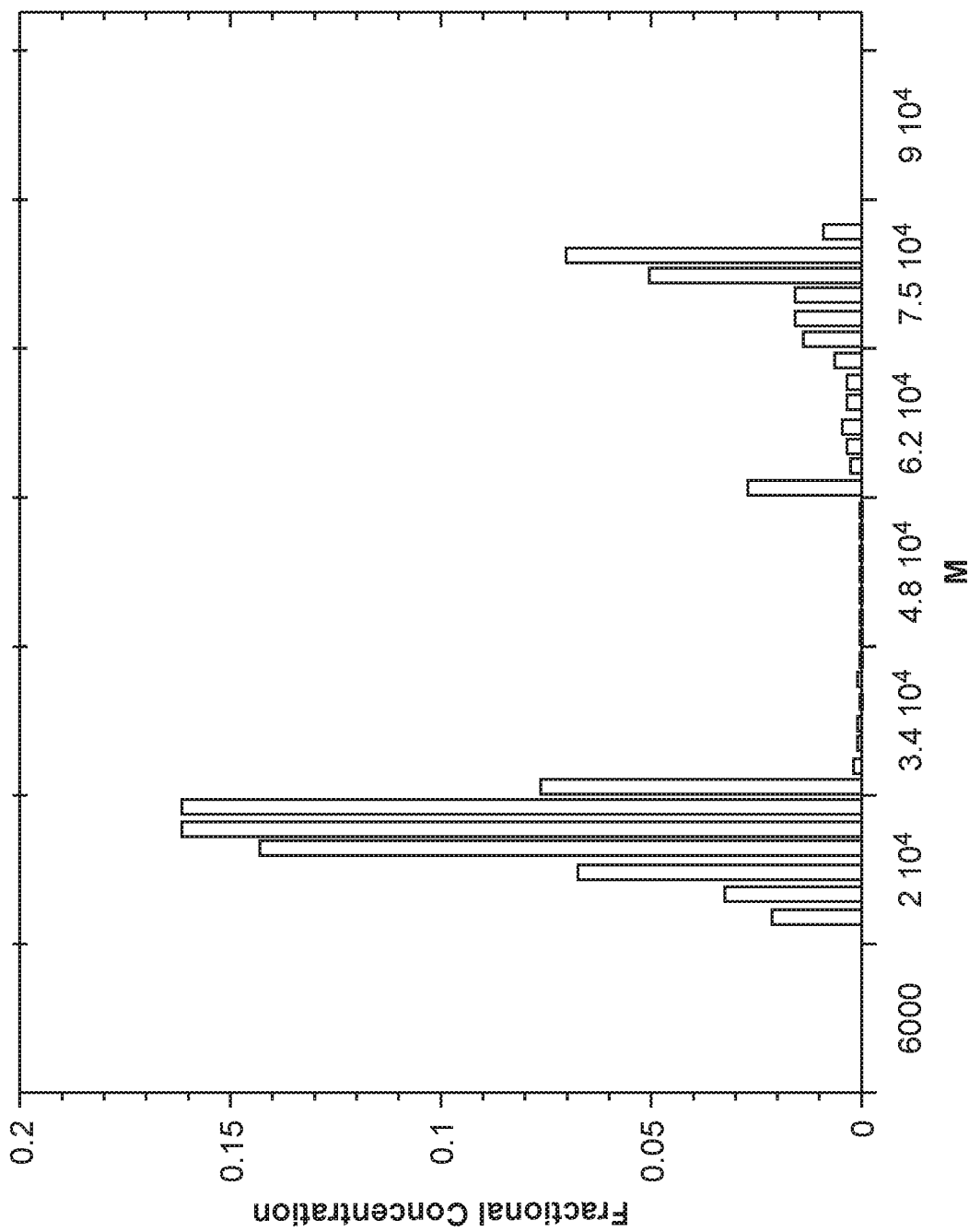
FIG. 2 illustrates the first published MWD histogram based on $M_{w,inst}$, according to an example embodiment of the present disclosure.

FIG. 2 illustrates the first published MWD histogram based on $M_{w,inst}$. See W. F. Reed, "A Method for Online Determination of Polydispersity during Polymerization Reactions", Macromolecules, 33, 7165-7172, 2000.

With respect to instantaneous and cumulative distributions of other polymer properties, it is noted that most monitoring instruments yield the cumulative value of the property they are measuring, such as molecular weight, intrinsic viscosity, polymer concentration, and copolymer comonomer composition. In fact, for any cumulative property $Q_c(t)$, if polymer concentration is known, then the instantaneous value of $Q_{inst}(t)$ can be found by $$Q_{inst}(t) = \frac{d[C_p(t)Q_c(t)]}{dC_p(t)}. \tag{2}$$

The instantaneous reduced viscosity distribution (IRVD) can be obtained by using the instantaneous weight averaged reduced viscosity $\eta_{red,w,inst}(t)$ together with an appropriate statistical distribution. $\eta_{red,w,inst}(t)$ is computed from online measurements of cumulative reduced viscosity $\eta_{red,w}(t)$ and $C_p(t)$ by $$\eta_{red,w,inst}(t) = \frac{d(C_p(t)\eta_{red,w}(t))}{dC_p(t)}. \tag{3}$$

While ACOMP measures $\eta_{red,w}(t)$, the limit of $C_p=0$ $\eta_{red,w}(t)$ equals weight average intrinsic viscosity $[\eta]_w$, that is $$[\eta]_w = \lim_{C_p \to 0} \eta_{red,w}. \tag{4}$$

Since $C_p$ in ACOMP is typically very low, it is often assumed this limit is reached during online measurements and the $[\eta]_w(t)$ is effectively monitored. Then, in this approximation $$[\eta]_{w,inst}(t) \cong \frac{d(C_p(t)\eta_{red,w}(t))}{dC_p(t)}. \quad (5)$$

Hence the method, including appropriate statistical distributions, yields both instantaneous intrinsic viscosity distributions (IIVD) and cumulative intrinsic viscosity distributions (CIVD). Because intrinsic viscosity measures hydrodynamic volume per molar mass, combining the IIVD and IMWD, and the CMWD and CIVD, can yield information on branching, crosslinking and other structural changes and properties of the polymer population during polymerization. Cross correlation of the CIVD and CMWD can give information on branching, cross-linking and other structural features of the final product.

Another possibility with the IIVD and CIVD is that, where a fixed relationship between molecular weight and intrinsic viscosity exists, for example of the Mark-Houwink form $$[\eta] = AM^\beta, \quad (6)$$

the IIVD can be computed from the IMWD, and the CIVD can be computed from the CMWD.

Another quantity for which distributions can be important is copolymer composition when two or more comonomers are polymerized. For N comonomers, each of time dependent concentration $C_1(t), C_2(t) \ldots C_N(t)$, the instantaneous fraction of comonomer j incorporated into polymer chains at time t, $F_{inst,j}(t)$ is $$F_{inst,j}(t) = \frac{dC_j/dt}{\sum_{j=1}^{N} dC_j/dt} = \frac{dC_j}{d\sum_{j=1}^{N} dC_j}. \quad (7)$$

Once $F_{inst,j}(t)$ is obtained for all monomers 1, 2, ... N at any point in time an appropriate composition distribution is applied to obtain the corresponding instantaneous composition distribution of each monomer j, and these are added to their respective cumulative composition distribution at each subsequent reaction point, weighted by the difference in concentration for each specific monomer j over the interval. The computation of $F_{inst,j}$ for copolymers (j=1, 2) was demonstrated using ACOMP. See, for example, A. Giz, A. Oncul Koc, H. Giz, A. M. Alb, W. F. Reed "Online monitoring of reactivity ratios, composition, sequence length, and molecular weight distributions during free radical copolymerization", Macromolecules, 35, 6557-6571, 2002.

Determination of $M_{w,inst}$ requires taking derivatives of data, which inevitably introduces noise. Smoothing and windowing methods for best determination of $M_{w,inst}$ from ACOMP data are a subject unto themselves. Additional guidance on the determination of $M_{w,inst}$, and the resulting MWD, is subsequently provided in the present disclosure.

Figure 3:
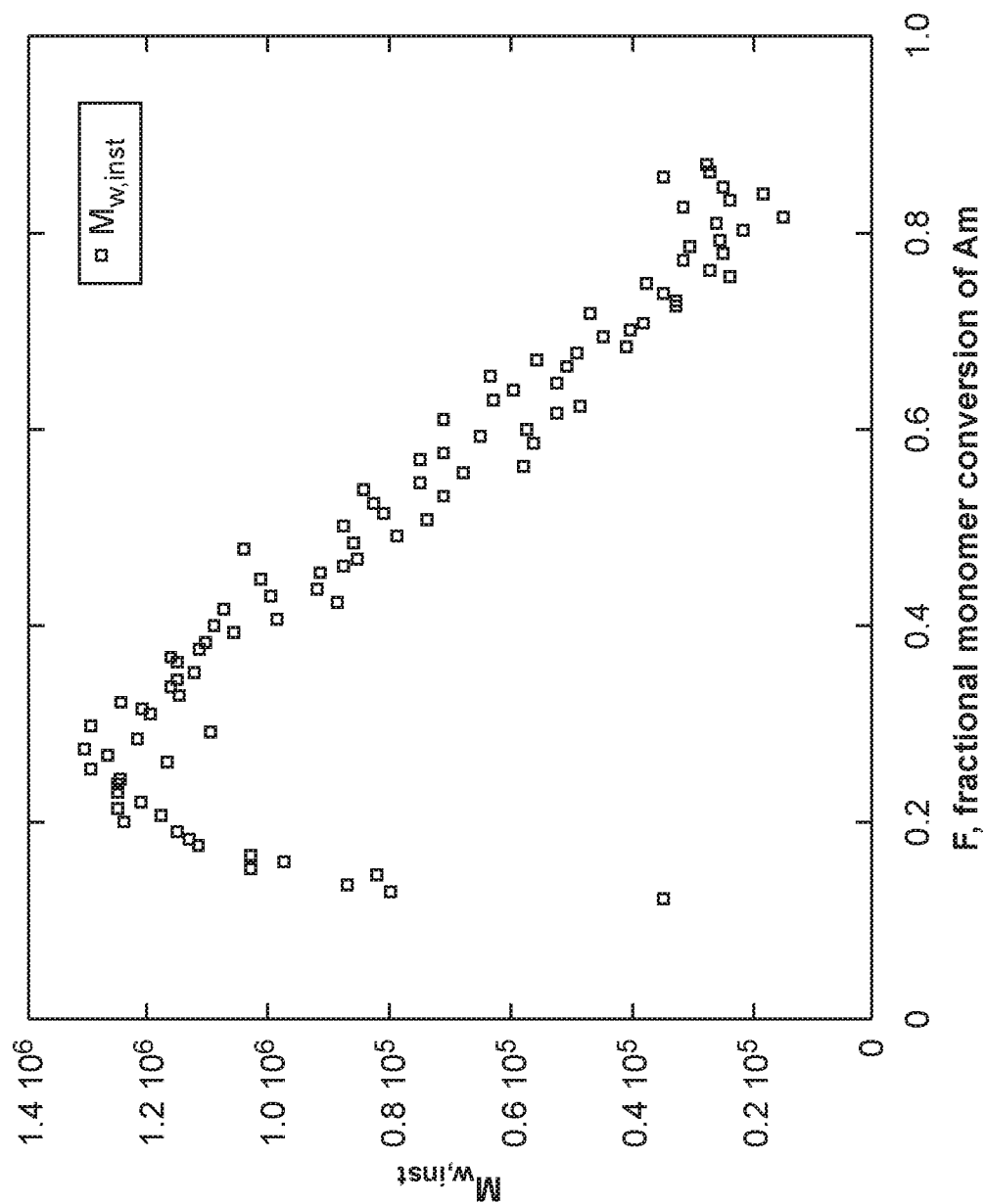
FIG. 3 illustrates $M_{w,inst}$ as a function of fractional conversion f, according to an example embodiment of the present disclosure.
Figure 4:
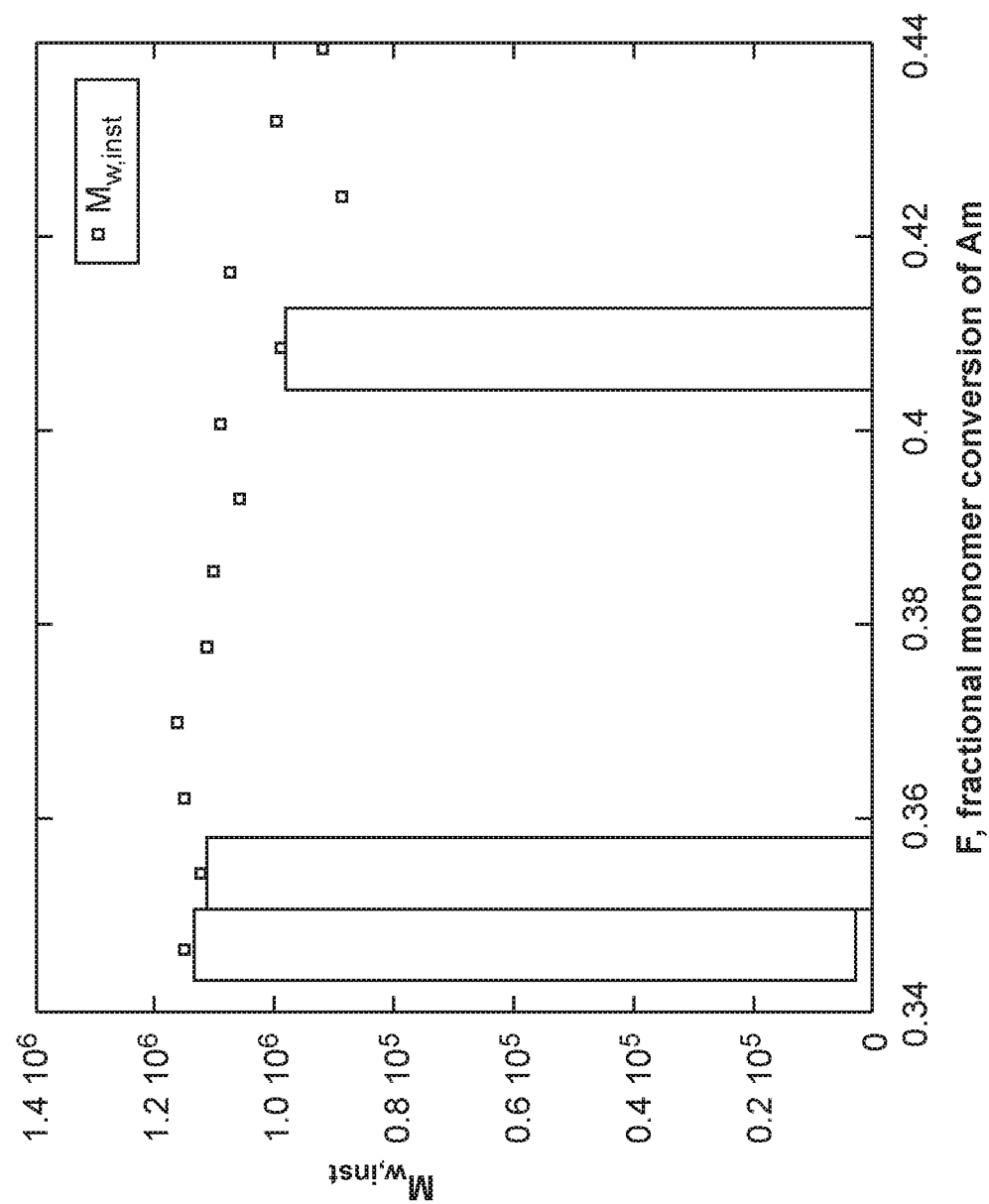
FIG. 4 illustrates a swath of $M_{w,inst}$ points from the same data as depicted in FIG. 3, according to an example embodiment of the present disclosure.

A first example, which used a smoothing fit, is shown in FIG. 3. FIG. 3 illustrates $M_{w,inst}$ as a function of fractional conversion f. The data are from ACOMP monitored aqueous free radical polymerization of acrylamide. The following discussion can also be used in semi-batch by simply substituting $C_p$ wherever f appears. FIG. 4 illustrates a swath of $M_{w,inst}$ points from the same data as depicted in FIG. 3. A straightforward approach takes a given $M_{w,inst}$ as a center point for an amount of conversion $\Delta f$, given by the width of each corresponding rectangle. For each $M_{w,inst}$ the rectangle width is the weight (amplitude) given to the distribution used.

The first step after $M_{w,inst}$ is obtained is to choose a plausible instantaneous distribution. A distribution frequently used for free radical polymerization is the geometric distribution, which comes from the binomial distribution by omitting the factorial factor that accounts for permutations. For this there is a certain probability that a propagating polymer chain will reach a given number of units j before terminating. The probability that a chain will add another unit rather than terminate is designated q. The probability of termination rather than adding a unit is (1−q). Hence, the probability of propagating j−1 times and then terminating is $$P_j = q^{j-1}(1-q). \quad (8)$$

$P_j$ is the probability of the chain being j units long, since the monomer, j=1, counts in this, so that one propagation gives j=2, two propagations gives j=3, etc. The value of q is determined by the ratio of the propagation rate to the sum of the rates of propagation, termination, and chain transfer $$q = \frac{k_p m R}{k_p m R + k_t R^2 + k_s S R} = \frac{k_p m}{k_p m + k_t R + k_s S}, \quad (9)$$

where m, R, and S are monomer, radical, and chain transfer agent concentrations, respectively, and $k_p$, $k_t$, and $k_s$ are the propagation, termination, and transfer rate constants, respectively. The monomer mass balance in the long chain approximation is $$\frac{dm}{dt} = -k_p m R. \quad (10)$$

In the often-used Quasi-steady state approximation (QSSA), it is assumed that $$\frac{dR}{dt} = 2F k_d I_2 - k_t R^2 \approx 0, \quad (11)$$

where F is the fractional efficiency with which an initiator radical I. initiates a propagating radical $R_1$., where I. results from the composition of initiator $I_2$ (e.g. potassium persulfate) via $$I_2 \xrightarrow{K_d} 2I\bullet$$

where $k_d$ is the initiator decomposition rate (exponentially sensitive to temperature). The decomposition reaction into two initiator radicals is the origin of the '2' in $2Fk_d I_2$ in equation 11. Equation 11 can be used to re-write equation 10 under the QSSA as $$\frac{dm}{dt} = -k_p m \sqrt{2F k_d I_2(t)}. \quad (12)$$

This is a valuable expression for planning semi-batch reactions where both initiator and monomer can be fed into the reactor. The relationship of this expression to chain transfer agents, branching agents, and coma-inducing oxygen, is subsequently provided in the present disclosure.

The kinetic chain length v is closely related to q. Ignoring chain transfer for now, the kinetic chain length is given for termination by recombination as $$v = \frac{k_p m}{k_t R}. \tag{13}$$

If the termination is by disproportionation, there is a factor of 2 in the denominator of equation 13. Ignoring chain transfer, $$q = \frac{v}{v+1}, \tag{14}$$

since chains are very long v>>1, meaning q is smaller than, but very close to unity.

As an Ansatz for our development we can use $M_{w,inst}$ to approximate q at each conversion interval Δf for which there is a value of $M_{w,inst}$ $$v \cong \frac{M_{w,inst}}{M_{monomer}}, \tag{15}$$

where $M_{monomer}$ is the molar mass of the monomer. For Am this value is $M_{monomer}$=70 g/mole.

Figure 5:
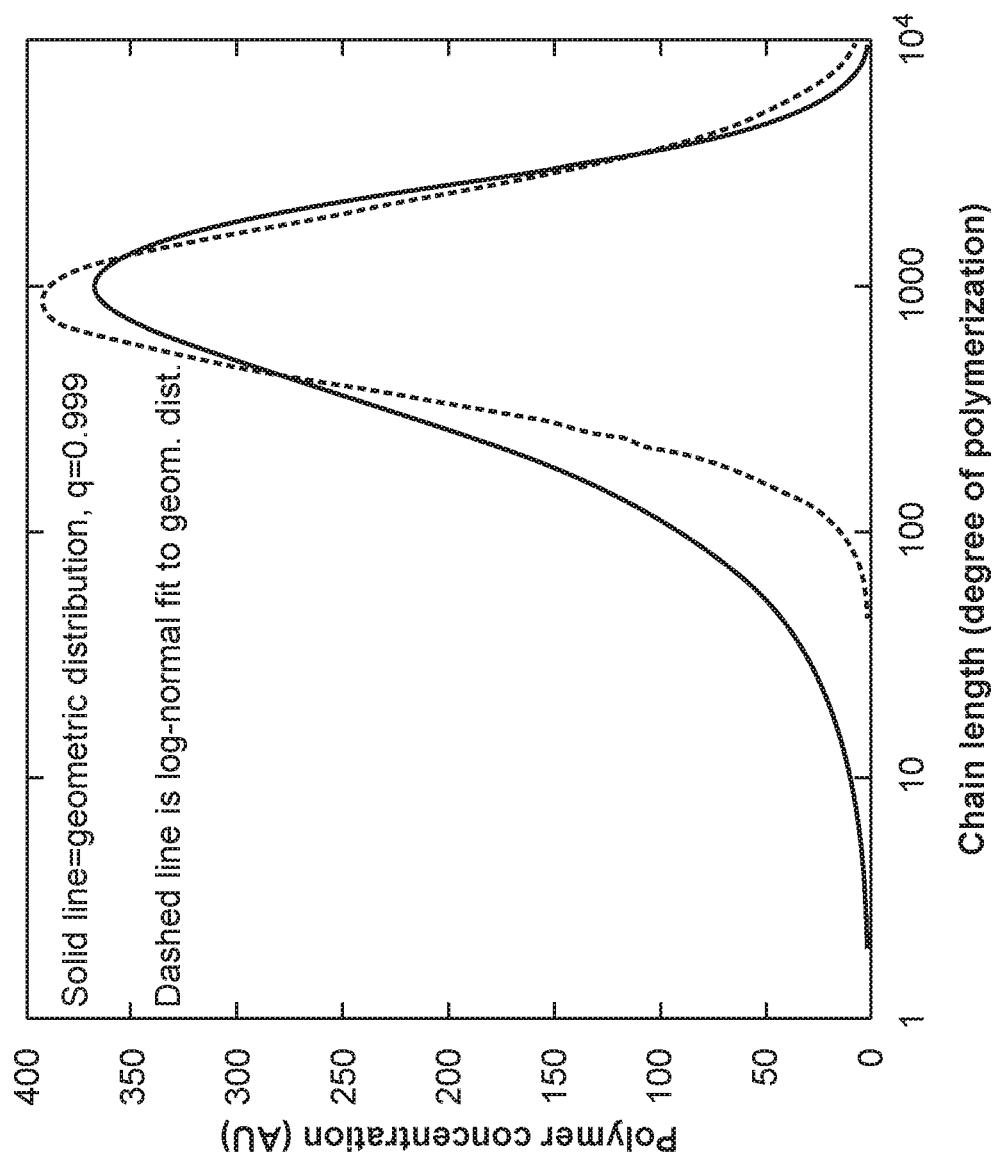
FIG. 5 illustrates polymer concentration versus chain length in which the geometric distribution for q=0.999, according to an example embodiment of the present disclosure.

FIG. 5 illustrates the geometric distribution for q=0.999, which corresponds to a chain length of 1,000, or a $M_{w,inst}$=70,000 for pAm (which is actually a fairly small chain for pAm). Also shown in FIG. 5, is a log-normal distribution fit to the geometric distribution. As depicted in FIG. 5, the fit is not very good. The log-normal distribution, however, is a 'workhorse' distribution in MWD analysis since it is easily manipulated analytically, being a continuous function, whereas the geometric distribution is discrete. Notice that the geometric distribution gives a left-skewed distribution, whereas the log-normal is completely symmetric. Both types of distributions are found in GPC, depending on the polymer sample and details of the chromatographic column and separation mechanism. The form of the distribution is liable to change depending on the specific type of polymerization reaction.

The form of the log-normal distribution is $$\sum (M) d\log(M) = A \exp\left(-\frac{\log(M/M_0)^2}{2\sigma^2}\right) d\log(M), \tag{16}$$

where Σ(M)d log(M) is the concentration of polymer in the molar mass range log(M) to log(M)+d log(M), $M_o$ is the average M of the log-normal distribution, and σ its width.

A convenient feature of this distribution is that the important averages are $$M_n = M_o \exp(-\sigma^2/2) \tag{17a}$$

$$M_w = M_o \exp(\sigma^2/2) \tag{17b}$$

$$M_z = M_o \exp(3\sigma^2/2) \tag{17c}$$

and $$M_w/M_n = \exp(\sigma^2). \tag{17d}$$

Figure 6:
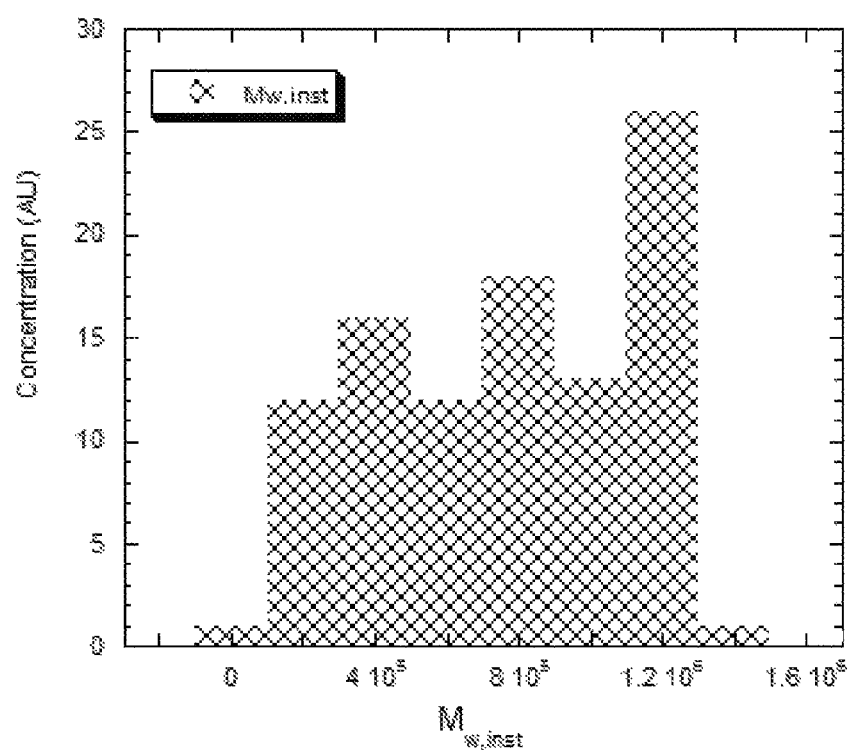
FIG. 6 illustrates a histogram distribution for $M_{w,inst}$ for a 3% polyacrylamide reaction in water at T=65° C. and 40× dilution in the ACOMP detector train, according to an example embodiment of the present disclosure.
Figure 7:
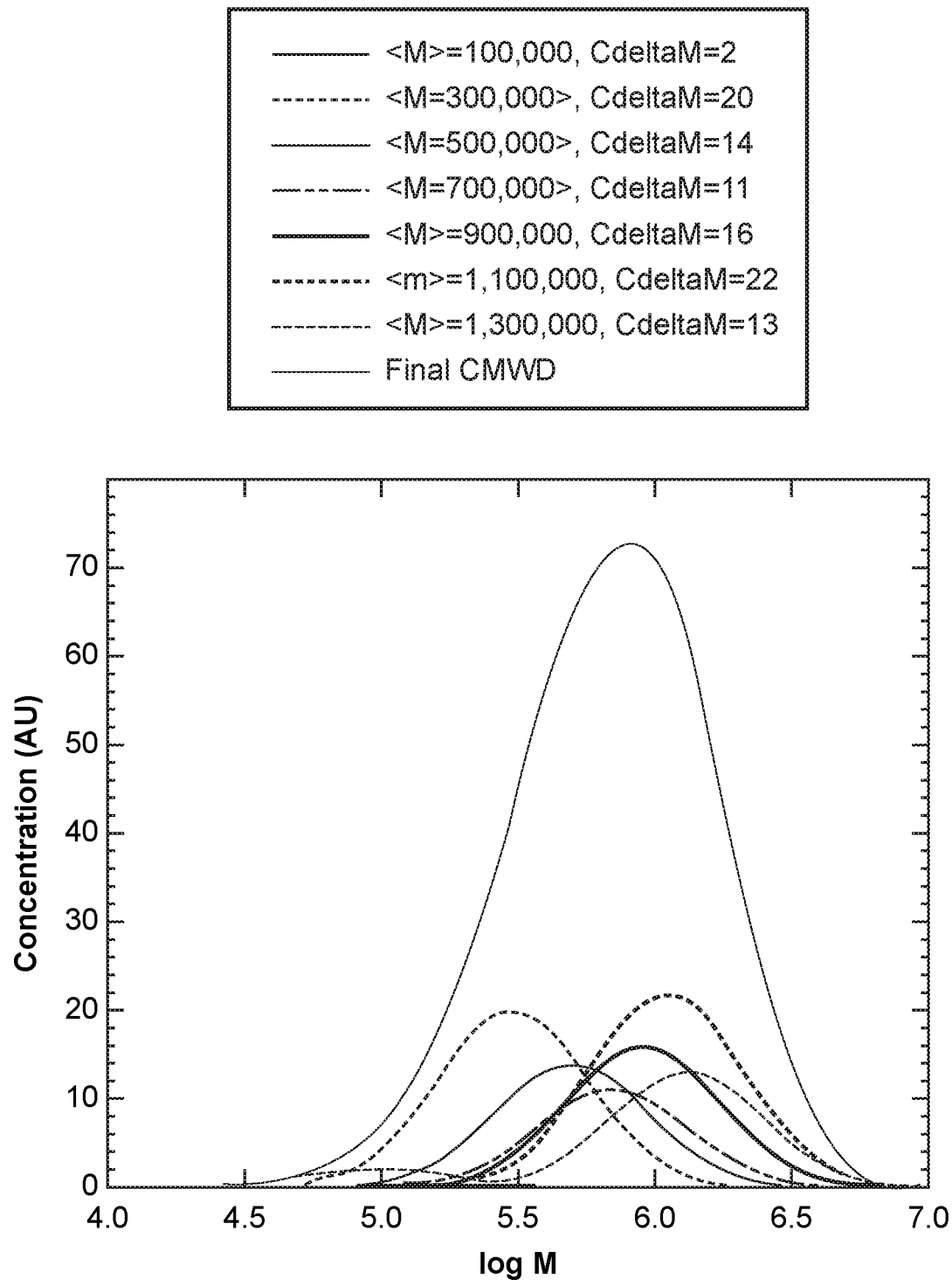
FIG. 7 illustrates IMWD and the final CMWD for the histogram data of FIG. 6, according to an example embodiment of the present disclosure.

FIG. 6 illustrates a histogram distribution for $M_{w,inst}$ for a 3% polyacrylamide reaction in water at T=65° C. and 40× dilution in the ACOMP detector train. FIG. 7 illustrates IMWD and the final CMWD for the histogram data of FIG. 6. A log normal distribution based on $M_w/M_n$=1.5 was used as the instantaneous distribution. The constituent log normal distributions for the net curve C(M) are shown. C(M) is simply the sum of the seven sub-distributions. The amplitude of each is from y-axis Concentration on the histogram. For constructing the MWD in realtime it is preferable to simply add each new distribution from $M_{w,inst}$ weighted by the width of the conversion interval the particular $M_{w,inst}$ represents as each new $M_{w,inst}$ is generated (the rectangle width in FIG. 4 illustrating the swath of $M_{w,inst}$ points). Hence, there will be as many sub-distributions as there are values of $M_{w,inst}$ at any given time during polymerization.

Figure 8:
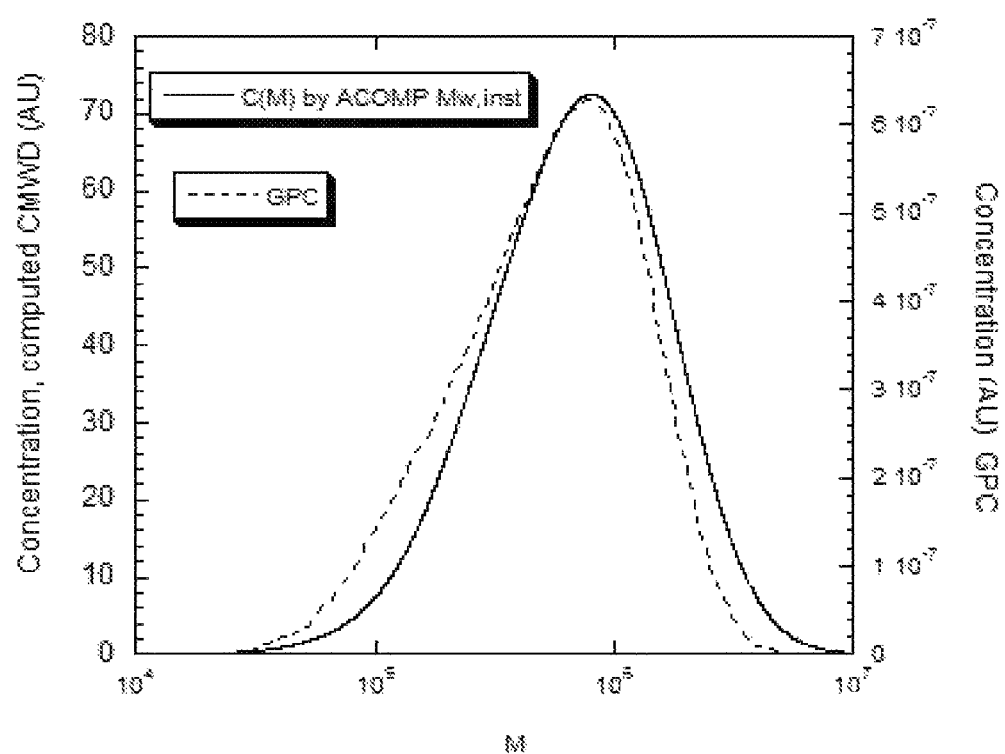
FIG. 8 illustrates a direct comparison of the GPC of the endproduct and the final CMWD (endproduct) from FIG. 7, according to an example embodiment of the present disclosure.

FIG. 8 illustrates a direct comparison of the GPC of the endproduct and the final CMWD (endproduct) from FIG. 7. The agreement is remarkable considering that there is no fitting in the below figure, rather, a straight-up dual plot of the MWDs determined entirely separately, by GPC in one case and by the $M_{w,inst}$ method for MWD from ACOMP described above. The molecular weights for the GPC distribution were determined by light scattering in conjunction with a refractive index (for concentration determination). The ACOMP molecular weight data are also from light scattering.

Example 1

A non-limiting example of steps to construct MWD from $M_{w,inst}$ from ACOMP:

Determine $M_{w,inst}$ at each realtime data point by anonline method for determining $M_{w,inst}$.

Select a distribution, for example, the geometric or log-normal distribution; notice that for the geometric distribution no assumptions of width are needed; the distribution is determined entirely by q, which we are approximated for each $M_{w,inst}$ according to equation 15 above. In fact, it can be shown that for the geometric distribution, $$M_n = \frac{M_{monomer}}{1-q} \tag{18a}$$

$$M_w = M_{monomer} \frac{1+q}{1-q} \tag{18b}$$

$$M_w/M_n = 1 + q \cong 2 \tag{18c}$$

Choose a molecular weight range; for Am $10^3$ to $10^7$ g/mole will normally be adequate. Divide this into log(M) intervals for log-normal or other continuous distributions. For the geometric and other discrete distributions the chain length distribution should be computed using every integer chain length of relevance; e.g. 1 to $10^5$. These data were used in the log-normal construction above. When computing the geometric distribution use dimensionless chain length N, instead of M. Use log(N) where N goes e.g. from N=2 to N=20,000.

Every time the ACOMP software delivers a value of $M_{w,inst}$, compute the distribution. Add this distribution to the growing CMWD by weighting each distribution by the change in $C_p$ that each $M_{w,inst}$ corresponds to. In this way, the CMWD will be generated throughout the reaction and at the end of the reaction the CMWD should match the GPC distribution fairly well.

The molecular weight distribution (MWD) of a polymer plays a dominant role in a polymer's properties, such as processability, strength, elastic moduli, etc., and is hence one of the most important characteristics determining the quality and applicability of a given polymeric product.

Currently, the only practical way of determining an entire polymeric MWD is via a separation technique. These include Size Exclusion Chromatography (SEC), Field Flow Fractionation (FFF), Matrix Assisted Laser Desorption Ionization Time of Flight mass spectroscopy (MALDI-TOR), Capillary Hydrodynamic Fractionation, Gel Electrophoresis, and several others. Since knowledge of the MWD furnishes the most complete description of a polymer distribution, there is intensive development and application of these techniques currently in progress. Some methods can indirectly approximate the MWD without fractionation by employing a model. An example is the use of a histogram, LaPlace transform, and other methods to analyze the intensity autocorrelation function from dynamic light scattering (DLS) to obtain z-averaged diffusion coefficient distributions, from which physical relationships between diffusion coefficients and molecular weight (MW) can be used to transform the diffusion coefficient distribution into a MWD. Note that the term "molecular weight," usually given in units of g/mol, is more accurately termed "molar mass." Since "molecular weight" is in such wide usage, the term is used in the present disclosure.

Several techniques exist for determining different averages of the MWD. These include membrane osmometry for direct determination of $M_n$, and light scattering for $M_w$. Other techniques determine averages of other quantities, which, via a model, can be related to one or more of the above averages. Determination of intrinsic viscosity, for example, generally yields a weight average intrinsic viscosity, which can be related to a moment of the MWD, if the relation between viscosity and MW is known.

Polymer populations in which all chains have identical masses are termed 'monodisperse'. Proteins and DNA of the same type are necessarily monodisperse, as they are coded for precise monomer sequences. In general, however, polymer populations contain a wide distribution of masses. Such populations are termed 'polydisperse'. While most synthetically produced polymers are polydisperse, many biopolymers are also produced in polydisperse populations; e.g. many polysaccharides, glycoproteins, and so on.

Some methods of producing polymers can lead to distinct subpopulations, widely separated in mass. When there is only a distribution with a single maximum the population is termed 'unimodal'. When two or more identifiable maxima exist within a polymer population it is termed 'multimodal'; i.e. 'bimodal' for two subpopulations, 'trimodal' for three, etc.

Some of the frequently encountered MWD are described next, as examples. These distributions are not limiting, rather, they represent well accepted and frequently used distributions. The present disclosure is not limited to any specific distributions.

The Binomial Distribution (BD)

If a total of N independent events occur, each with the same probability q for success, and the probability for failure in each event is (1-q), then the probability that j events out of N are successful is given by the BD $$W(N, j, q) = \frac{N!}{(N-j)!j!} q^j (1-q)^{N-j}. \quad (19)$$

The factorial terms take account of the number of sequences, or permutations, in which N events could occur to give a total of j successes and N−j failures. The average number of events that occur is computed by $$<j(N, q)> = \frac{\sum_{j=0}^{N} j W(N, j, q)}{\sum_{j=0}^{N} W(N, j, q)} = qN. \quad (20)$$

For example, consider that a coin is tossed 10 times (N=10). The probability of obtaining 2 heads (j=2) during this trial, according to eq. 17, is 45/1024=4.4%. The probability of obtaining 5 heads is 252/1024=24.6%. The average number of heads for many individual trials of ten tosses each is 5.

The binomial distribution can be generalized to trinomial and any multinomial distribution. Given the probability of event A is $q_A$ and of event B is $q_B$, the probability of neither event A or B is $(1-q_A-q_B)$. The trinomial distribution gives the probability that after N events A will have occurred j times, B k times, and neither A nor B N−j−k times is $$W(N, j, k, q_A, q_B) = \frac{N!}{j!k!(N-j-k)!} q_A^j q_B^k (1-q_A-q_B)^{N-j-k}. \quad (21)$$

The Geometric Distribution (GD)

The geometric distribution (GD) is a special case of the BD and is ubiquitous in polymer science. It arises when only one sequence out of the N!/[(N−j)!j!] possible sequences is relevant for the success of obtaining j successes.

If ideal free radical polymerization chains are formed very quickly with respect to the total time of monomer conversion, then any given propagating chain sees an environment (concentration of radicals, monomers, solvent, etc.) that changes little during its formation. It is of interest to know after N free radical events what the probability is that there were N−1 consecutive events (j=N−1) that chained monomers to free radical, and a final 'chain killing' event that terminated the chain by a radical-radical encounter. Although there are N!/[(N−1)!1!]=N different sequences of events that give N−1 monomers and one terminated radical in a chain, the only physically possible sequence is when the terminated radical is at the end of the chain.

The probability q of adding a monomer, instead of terminating via a collision with a free radical, is given by equation 9 above.

The probability that a chain of length i is reached is $$P_i = (1-q)q^{i-1}. \quad (22)$$

If $n_i$ is the number of chains of chain length i, where $n_{total}$ is the total number of chains then $n_i$ will simply be equal to $$n_i = n_{total} P_i, \quad (23)$$

since $P_i$ is a normalized distribution. The GD also describes step growth polymerization, where q is replaced by p, the degree of polymerization.

It is noted that q is not necessarily independent of chain length, in which case q would be replaced by a chain length dependent probability $q_i$, so that $$P_i = (1-q_i)q_i^{i-1}. \quad (24)$$

This could occur, for example, when the propagation and/or termination constants are chain length dependent.

According to the Smoluchowski theory of diffusion controlled rate constants, a rate constant k is proportional to $$k \propto (R_1 + R_2)(D_1 + D_2). \quad (25)$$

For example, consider a free radical polymerization reaction, and let 1 be the free radical bearing polymer chain and 2 be a monomer. $R_2$ and $D_2$ (monomer) do not depend on chain length, instead, $D_1$ of the propagating radical chain depends on the chain length, whereas the 'target' area, which is the free radical remains the same and so $R_1$ may not change greatly during the reaction. These considerations indicate that both termination and propagation constants $k_t$ and $k_p$, respectively, can be chain length dependent.

Gaussian Distribution (GAD)

This is a continuous distribution and is obtained from the binomial distribution in the case where q=0.5, and N>>j, and the average Nq=m>>1. This is a continuous function, completely defined by two parameters, the mean <x>(indicated by m in the foregoing distributions), and the width (or standard deviation) σ. The form of the GaD is $$W(x) = \frac{\exp[-(x - <x>)^2 / 2\sigma^2]}{\sigma\sqrt{2\pi}}, \quad (26)$$

where W(x) is a normalized distribution.

A form for chain length distributions that is found to arise experimentally in many situations is the log-normal distribution $$W(\ln x) = \frac{\exp[-(\ln x - <\ln x>)^2 / 2\sigma^2]}{\sigma\sqrt{2\pi}}, \quad (27)$$

where W(lnx)d(ln x) is the probability of there being chains in the interval from ln x to ln x+d ln x.

Poisson Distribution (PD)

This is the BD in the special case where N>>j and q<<1. With m=qN, the average value of j for the distribution $$W(j) = \frac{m^j e^{-m}}{j!}, \quad (28)$$

where m is the average number of successful events, m=Nq. The distribution is completely determined by the single parameter m. The width, or standard deviation of W(i) for the PD is sqrt(m). An important property of the PD is that the ratio of the width to the average value is hence 1/sqrt(m).

The Poisson distribution is applicable to chain growth reactions where initiation is of propagating species is very quick, termination is a negligible mechanism and the time it takes for the chain to grow is comparable to the time it takes for complete conversion of monomer. Such polymerization reactions are often termed 'living polymerization', because, since there is no termination mechanism the polymer is always 'alive'. These conditions are commonly met in anionic polymerization, and a growing number of 'controlled' free radical schemes, such as ATRP (atom transfer radical polymerization), NMP (nitroxide mediated polymerization), RAFT (reversible addition fragmentation transfer), ROMP (ring opening metathesis polymerization), and others.

In this case there is a population of a fixed number of slowly growing chains. The number of initiated monomers at the outset of the reaction is equal to the concentration of initiator $I_0$; e.g. lithium alkyls. This number does not change throughout the reaction. Over any short interval there is an average chain size <j>, and the number of monomers in a chain is small compared to the total number of monomers in the reactor. The chain length distribution W(i) is $$W(j) = e^{-\tau} \frac{\tau^{j-1}}{(j-1)!}, \quad (29)$$

where τ is related to both monomer conversion and the ratio of converted polymer to initial initiator concentration $I_0$ via $$\tau = \frac{M_0 - M}{I_0}. \quad (30)$$

τ increases as the reaction proceeds and monomers are added to growing chains. It is remarkable that since the width to average of the chain length distribution is 1/sqrt(τ), the polydispersity in living polymerization actually decreases as the reaction proceeds. Living polymerization reactions are of great practical importance in producing low polydispersity polymers.

Computation of Molecular Weight Averages

Often times it is of direct interest to work with the polymer mass distribution $n(M_i)$, which is the number of polymers of mass $M_i$ present in a population $$n(M_i) = n_{total} W(M_i). \quad (31)$$

The concentration, expressed as a continuous function, C(M), where C(M)dM is the concentration of polymer in the interval M to M+dM, is related to n(M) (where n(M)dM is the number density of particles in M to M+dM) by $$C(M) = Mn(M), \quad (31)$$

with the normalization condition that $$c_{total} = \int_0^\infty C(M) dM, \quad (33)$$

where $c_{total}$ is the total concentration of polymer in a population. Normalization is not necessary in computing averages of the MWD, since normalization constant will cancel in the numerator and denominator. $M_n$, $M_w$ and $M_z$ are given in terms of C(M) as $$M_n = \frac{\int C(M) dM}{\int \frac{C(M)}{M} dM} \quad (34a)$$

$$M_w = \frac{\int M C(M) dM}{\int C(M) dM} \quad (34b)$$

$$M_z = \frac{\int M^2 C(M) dM}{\int M C(M) dM}. \quad (34c)$$

Accordingly, there are a variety of distributions that can reasonably describe MWD. Hence, the actual forms used for MWD calculations are not limiting, and any conceivable distribution or modification thereof can be used in the context of the current approach.

Separations-Based Determinations of MWD

GPC (gel permeation chromatography) is the most widely used separations technique for polymer MWD, but there are many others, including MALDI-TOF (matrix assisted laser desorption ionization time of flight mass spectroscopy) see, for example, Malik, Muhammad Imran; Pasch, Harald, Matrix-assisted laser desorption ionization mass spectrometry of synthetic polymers", Progress in Polymer Science (2014), 39(1), 87-123, field flow fractionation, see, for example, Pasch, Harald, "Advanced fractionation methods for the microstructure analysis of complex polymers", Polymers for Advanced Technologies (2015), 26(7), 771-784, and other separation column based methods such as temperature rising elution fractionation, see, for example, Xu, Junting; Feng, Linxian, "Application of temperature rising elution fractionation in polyolefins", European Polymer Journal (2000), 36(5), 867-878, Anantawaraskul, Siripon; Soares, Joao B. P.; Wood-Adams, Paula M., "Fractionation of semicrystalline polymers by crystallization analysis fractionation and temperature rising elution fractionation", Advances in Polymer Science (2005), 182(Polymer Analysis—Polymer Theory), 1-54, CRYSTAF, see, for example, Soares, Joao B. P.; Anantawaraskul, Siripon, "Crystallization analysis fractionation", Journal of Polymer Science, Part B: Polymer Physics (2005), 43(13), 1557-1570, and others.

While GPC is the most widely used method for MWD, there are many problems associated with the technique, such that, broadly speaking, it is only a semi-quantitative method and the results it produces are highly dependent on many factors. Some of these factors include:

1) True SEC separation; universal calibration. Many people use the terms 'SEC' and 'GPC' interchangeably. In fact, SEC (Size Exclusion Chromatography) is the limit of GPC when the separation of polymer molecules occurs according to hydrodynamic volume; i.e. when the separation mechanism is purely entropic and there are no enthalpic interactions between the polymer and GPC column. When there are interactions between the polymers and the separation column packing material an enthalpic effect is added to the entropic term which can greatly complicate interpretation of GPC results. A common misunderstanding is that when in the SEC limit, separation of polymers occurs according to polymer molecular weight. In fact, in the SEC limit separation occurs according to polymer hydrodynamic volume. Benoit et al. developed a means of 'universal calibration' in which both the concentration and intrinsic viscosity [η] of polymer fractions eluting from a GPC column are simultaneously measured. See Benoit, H.; Grubisic, C.; Rempp, P.; Decker, D.; Zilliox, J. G. J. Chim. Phys. Phys.-Chim. Biol., 1966, 63, 1506; Grubisic, C.; Rempp, P.; Benoit, H. J. Polym. Sci., Polym. Lett. Ed., 1967, 5, 753. Einstein related intrinsic viscosity to hydrodynamic volume via the following relationship $$[\eta] = \frac{5V_H}{2M}. \tag{35}$$

Hence, if a series of reference polymers of known [η] and M are used, a 'universal calibration' of $V_H$ vs EV can be established for a given separation column operating at a given flow rate, where EV is the elution volume. With this calibration curve, an unknown polymer's MWD can be determined, if [η] is determined for points along the chromatogram, and the separation indeed occurs via SEC (i.e. with no enthalpic interactions). Determination of [η] requires measurements of both concentration (such as with a differential refractive index detector or Ultraviolet or visible absorption spectrophotometer) and viscosity (such as with a single capillary or multiple capillary viscometer, the hydraulic Wheatstone bridge viscometer being a widely used version of the latter. See Haney, Max A. "A Differential Viscometer", American Laboratory (Shelton, Conn., United States) (1985), 17(3), 41-8, 50, 52, 54, 56. [η] is determined from total solution viscosity η, pure solvent viscosity $\eta_s$ and polymer concentration $C_p$ according to $$[\eta] = \frac{\eta - \eta_s}{\eta_s C_p}. \tag{36}$$

The universal calibration method is successful when SEC is the operative separation mechanism, which often occurs for polymers in organic solvents, and much less frequently occurs for water soluble polymers. In spite of its success, it is not nearly as widely used as traditional column calibration, mentioned next. When non-SEC mechanisms are involved in the separation then the method can fail dramatically.

2) True SEC separation; calibration of the separation column using 'molecular weight standards'. Despite increasing adoption of multi-detector methods for GPC, the use of molecular weight standards is still the most widespread method, chiefly because it is the simplest and most economical method, even if its results are often fundamentally questionable.

This method assumes separation is via SEC and uses molecular weight standards and a concentration detector (such as RI and/or UV) to determine at which EV each standard elutes for a given column under given flow conditions. While the last section described how separation occurs according to hydrodynamic volume $V_H$ and not molecular weight M, invariably the user of this method will make a plot of M vs EV based on the molecular weight standards. (The exception is when a viscosity detector is coupled to the system and universal calibration is used, as described above.) With this calibration, the EV profile of the unknown polymer is taken and a value of M associated with each EV, according to the calibration curve, and the corresponding concentration is used to yield concentration of polymer vs M. Concentration can also be normalized to give the fraction of the polymer population vs M.

The major disadvantage of this method, besides assuming strict SEC separation, is that it assumes that the unknown polymer has the same $V_H$ vs M profile, which is strictly only true if the unknown polymer is the same as the calibration standard. Hence, this method is only exact in the extremely limited and not common situation where the unknown polymer is exactly the same as the calibration polymer. There are many effects which produce deviations from a given unknown molecule's $V_H$ vs M profile vis-à-vis $V_H$ vs M for the calibration standard: intrinsic stiffness, persistence length, linear mass density of a chain, excluded volume effects, branching, solvent quality, interaction of the unknown polymer with the separation column (non-SEC effects) and many other factors. Besides this, a technical factor effecting accuracy is that the validity of the chromatogram vs EV assumes precise timing of injection and precise and steady flow rate in the GPC system. Since M is exponentially related to EV, small uncertainties or errors in EV lead to exponential uncertainties in M.

As a result of these many factors the MWD and corresponding averages, such as $M_n$, $M_w$, and $M_z$, produced from calibration standards must be scrutinized with caution. In fact, what is frequently the case is that a GPC user attempts to find repeatable trends in the MWD as opposed to highly accurate and precise absolute values in the MWD. Hence, for example, a polymer manufacturer may know what a GPC chromatogram and MWD analysis using calibration standards looks like for a good product and what they look like for bad products, and hence can try to ensure quality by matching the MWD of products to the MWD of the best products. In this case, it is not important to have absolute values of MWD, and corresponding $M_n$, $M_w$, and $M_z$, just repeatability of the MWD. This may even be considered 'obtaining a consistently wrong answer to achieve a consistent desired product quality'.

3) Absolute determination of MWD using light scattering coupled to GPC. Over the past several decades the use of total intensity light scattering has become commonplace as a molecular weight detector for GPC. Such detectors measure the total scattered light, often in terms of the so-called Rayleigh ratio, $I_R$, whose absolute value can be obtained by referencing a polymer sample's scattering to that of either a pure substance of known $I_R$ (e.g. toluene), or to that of a polymer of known molecular weight, such as the narrow polydispersity molecular weight standards used for calibration of GPC columns. One designation for this type of detection is MALS, or multi-angle light scattering. Multiple angles allow extrapolation of the angular scattering envelope to 0 degrees, where the absolute weight average molecular weight $M_w$ can be determined. Such extrapolations are necessary for polymers whose dimensions are larger than roughly 10 nm, which for a typical random coil polymer is on the order of $10^5$ g/mole. For polymers with dimensions smaller than this measurement at a single angle, usually 90°, is sufficient. The polymer concentration is usually low enough in GPC detection that second virial coefficient ($A_2$) effects can be ignored, or corrected for.

Total intensity light scattering is frequently referred to as 'static light scattering' (SLS), which distinguishes it from dynamic light scattering (DLS). While DLS is a very popular particle sizing method for particles smaller than a few microns it has only fairly recently been adapted to GPC and is still not in widespread use. Reasons for this include the fact that DLS requires an integration time of at least several seconds, whereas SLS makes instantaneous measurements, DLS autocorrelation functions contain a flow component that is difficult to deal with, so that stop-flow methods are usually used when DLS is used in a flowing system. Finally, DLS reports a diffusion coefficient, which is related to a polymers equivalent hydrodynamic radius, but only indirectly to its molecular weight.

In principle, the great advantage of SLS in the GPC context is that it requires no calibration of the column, rather, it directly measures $M_w$ of each data point in the elution profile. This means that SLS can work even when the separation mechanism is not SEC; i.e. when there are enthalpic interactions between the polymer and the GPC column. SLS thus frees the user from knowing the details of the column's separation mechanism and making column calibration curves on a supposed purely SEC mechanism. In this sense it is irrelevant how the column separates polymers as long as it separates them in some manner. But this assertion is facile. In reality, even pure SEC separation can cause more than one type of polymer molecule in a heterogeneous population to elute in the same elution slice. In this case one measures $M_w$ of an elution slice which itself may have considerable polydispersity. An example would be a copolymeric polyelectrolyte which contains polymers of both varying linear charge density and molecular weight. A small, highly charged polymer could have the same hydrodynamic volume as a much larger but more weakly charged polymer and hence both polymers would elute in the same elution slice. Another example is where the sample may contain molecules with varying degrees of branching. In this case a highly branched, massive molecule could have the same $V_H$ as a much lighter and less cross-linked molecule and elute in the same slice. Many more scenarios can be thought of where SEC separation will not separate polymers according to molecular weight and will hence give a distorted MWD. In these cases SLS will at least give an absolute $M_w$ for each elution slice, no matter the degree of polydispersity in the slice, whereas column calibration will only give a standard equivalent or hydrodynamic volume equivalent MWD, and hence will not provide any polydispersity information from each slice.

Further complications arise when the separation method is no longer predominantly SEC, such as when polymers interact with the GPC column. In such cases both calibration schemes, universal calibration and column calibration by mass standards, can fail completely. SLS will continue to accurately report the $M_w$ or each elution slice even in this situation, but even more overlap of polymers in heterogeneous populations can occur. For example highly charged polymers can interact strongly with the column and be retained longer than less charged polymers, causing increasing polydispersity of $M_w$ in each elution slice and distorting the MWD.

Besides the above mentioned effects, which influence all the calibration and SLS approaches to GPC, there are detrimental effects specific to SLS. One is that SLS is less sensitive to low mass polymers and noisy data, or even no data might be obtained on the lower portion of the MWD. This can artificially increase $M_n$ and hence artificially decrease the important polydispersity index $M_w/M_n$. Concentration detection, such as by RI or UV, is insensitive to M and so reports polymer concentration regardless of M, which avoids the artificial lowering of $M_w/M_n$. One way to deal with this in SLS is to extrapolate the values of M from the strong SLS data into the low concentration ends of the chromatogram, especially the low mass end. This is equivalent to creating a 'customized calibration' for the column for every GPC injection. While this method can ameliorate distortions in MWD and lead to much smoother appearing chromatograms, any method based on extrapolation has some inherent uncertainty involved, and depends on functional forms assumed, weighting, and other factors.

Yet another problem with the SLS approach, which is shared with universal calibration, is the fact that two detectors are used, usually in series, but often also in parallel. When used in series there is an interdetector delay volume and, while this may seem slight, it has been shown that $M_n$ and $M_z$ can be highly sensitive to even small errors in interedetector delay volume determination. See, for example, D. P. Norwood, W. F. Reed "Comparison of Single Capillary and Bridge Viscometers as Size Exclusion Chromatography Detectors", Int. J. Polym. Ana. and Char., 4, 99-132, 1997. Differences of a few tens of microliters in this delay volume can significantly increase or decrease the indices $M_w/M_n$ and $M_z/M_w$, depending on whether the error is negative or positive with respect to the true delay volume. $M_w$, as determined from the MWD, it should be noted, is independent of the delay volume, since it is the ratio of the integrated SLS peak to the integrated concentration peak. Of course, in this sense, $M_w$ can be directly determined on an unfractionated sample, without use of GPC or other separation method.

In all the aforementioned cases it is possible to assess the many effects discussed by using other eluents, columns, temperatures, flow rates, etc., by cross-correlating results from the different calibration and SLS approaches, using complementary non-separation methods (e.g. batch SLS and viscometry), etc. The amount of time and effort, however, can become excessive and one is faced with weighing the value of the results against the economic and labor expense to obtain them.

In passing it is noted that use of other separation methods, such as FFF, CHD, MALDI-TOF, and others similarly have many associated difficulties in practice and interpretation. Hence, the current method proposed here could be termed 'chromatography-free MWD determination' or more broadly, 'separation-free determination of MWD', or 'fractionation-free determination of MWD', which then includes the non-chromatographic separation methods. In the current method there is no physical separation by a column, field or other device, rather the 'separation' occurs in time, each molecular weight increment added to the growing MWD being determined via $M_{w,inst}$.

It can finally be noted that some non-separation methods, especially dynamic light scattering (DLS), have approximate means of determining diffusion coefficient distributions, DCD. The algorithms used for determining these start with the scattered light intensity autocorrelation function and finding a DCD by LaPlace transform, multiple exponential fitting, histograms, etc. While these can have value for spherical colloids, such as latex particles, DLS is not currently recognized as a substitute in polymer science for GPC or other separation methods. Likewise, Mie scattering is frequently used for determining particle size distributions of colloidal scatterers in the range of 0.1 micron to 100 microns. It is not generally applicable to most polymer chains, since these are seldom Mie scatterers. Large structures composed of cross-linked polymers, such as spherical latex particles, are Mie scatterers and are frequently characterized by Mie methods. Such particles are not normally analyzable by GPC.

Assessment of the Proposed Separations-Free Determination of Mwd Vis-à-Vis GPC

While GPC is often considered the 'gold standard' for polymer MWD determination, the brief account above outlined some of the many difficulties in GPC practice that make it only a semi-quantitative method, and maintain it as a sort of 'art'. GPC is an industry unto itself, with many different manufacturers of specialized instrumentation and GPC columns, distributors, and training courses, and will prevail for the foreseeable future as the pre-eminent means of MWD determination.

The (physical) Separations Free MWD method (SFM) proposed here eliminates many of the complications of physical separations based methods. It is based on two premises:

An instantaneous average of molecular weight <M> can be obtained during the synthesis of the polymer, and the MWD can be built up during synthesis, through to the endproduct, by using a fundamentally applicable probability distribution on each instant instantaneous average molecular weight, and summing these up during synthesis, weighted by the incremental amount of polymer concentration increase between successive determinations of <M>.

Given the ability to obtain $M_{w,inst}$ by ACOMP and the fundamental nature of statistical distributions that describe MWD, the authors believe that the SFM approach may provide a more reliable means of determining MWD, without the complications introduced by separations devices and their interpretation. Of course, SFM requires ACOMP instrumentation, which is itself complex, but its use, first and foremost can ensure optimized production of polymers, while the online use of SFM with ACOMP can both help achieve this optimization and eliminate the need for costly and inefficient GPC analytical laboratories used for end-product quality control.

Further Examples of Determining $M_{w,inst}$ and Application to Determination of MWD As discussed above, continuously monitoring the polymer concentration $C_p$ and the absolute molecular weight $M_w$ allows calculation of $M_{w,inst}$. In obtaining $C_p$, $M_w$ and $M_{w,inst}$, it is possible to invoke models and specific functional forms or to treat the data numerically, without assignment of models or specific functional forms. The latter has been the preferred mode of treating ACOMP data through most of the publications on the topic, and the examples below, not limiting but merely illustrative, focus on obtaining $C_p$, $M_w$ and $M_{w,inst}$ numerically. $M_{w,inst}$ must be calculated using numerical differentiation techniques. The derivative of the discrete signal can be approximated by the difference quotient in the following way, $$M_{w,inst} = \frac{(C_{p,i}M_{w,i}) - (C_{p,i-1}M_{w,i-1})}{(C_{p,i} - C_{p,i-1})}, \tag{37}$$

where i normally denotes data collected at each time i. Due to the noise inherent in the signals however, it is meaningless to take the pointwise difference quotient as a means of calculating $M_{w,inst}$. The values calculated in this way would be overwhelmed by noise rather than representing the true values of the signal. Furthermore, because the derivative in question is being calculated with respect to $C_p$ rather than time, the data is resampled at evenly spaced $C_p$. The subscript i then denotes the value of the signal at the end of the $i^{th}$ window, where each window will vary in the number of data points according to the desired window width in $C_p$ and the growth rate of $C_p$.

A number of process methods can be performed on this window of data in an attempt to minimize the effect of noise on the signal, approximating the true value of the signal at the window's end. A few of the processing methods can include, but are not limited to, removing outliers, computing a least squares regression fit line, or applying a low-pass filter. The best approximation method for the window of data is selected by various tests, which can include using knowledge gathered from historical trends. The final value of this window is then used as the $i^{th}$ value in the $M_{w,inst}$ numerical differentiation.

Alternatively, rather than waiting for a threshold $C_p$ value to calculate an $M_{w,inst}$ value for a window of data, a continuous trend of $M_{w,inst}$ can be obtained as a rolling calculation $$M_{w,inst}(t) = M_w(t) + C_p(t)\frac{M_w(t) - M_w(t - \Delta t)}{C_p(t) - C_p(t - \Delta t)} \tag{38}$$

Δt should be small compared to the total time of the reaction, but large enough to measure a real change in the relevant variables.

The $M_{w,inst}$ is displayed to the reaction operator and/or fed back into the control process for ACOMP to guide the reaction, if necessary. The $M_{w,inst}$ value is also used as the mean for an instantaneous molecular weight distribution (IMWD), which is added to the cumulative molecular weight distribution (CMWD).

Signal Processing
Removing Outlier Points

Figure 9:
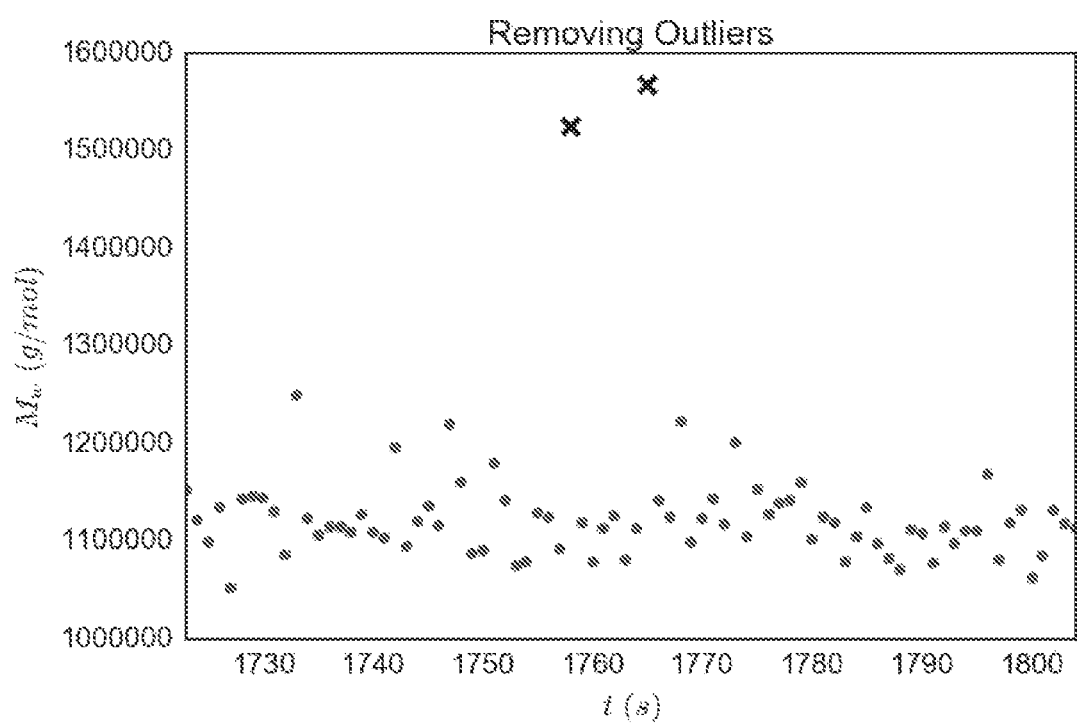
FIG. 9 illustrates the rejection as outliers of data points that lie more than three standard deviations away from the mean, according to an example embodiment of the present disclosure.

The mean and standard deviation are calculated for each window of data. As a non-limiting example, if a datum deviates from the window's mean by more than three standard deviations, it can be excluded. For example, as shown in FIG. 9, data points that lie more than three standard deviations away from the mean are rejected as outliers. There are also other methods of rejecting outliers, including using more robust estimators, such as the median.

Low-Pass Filter

Figure 10:
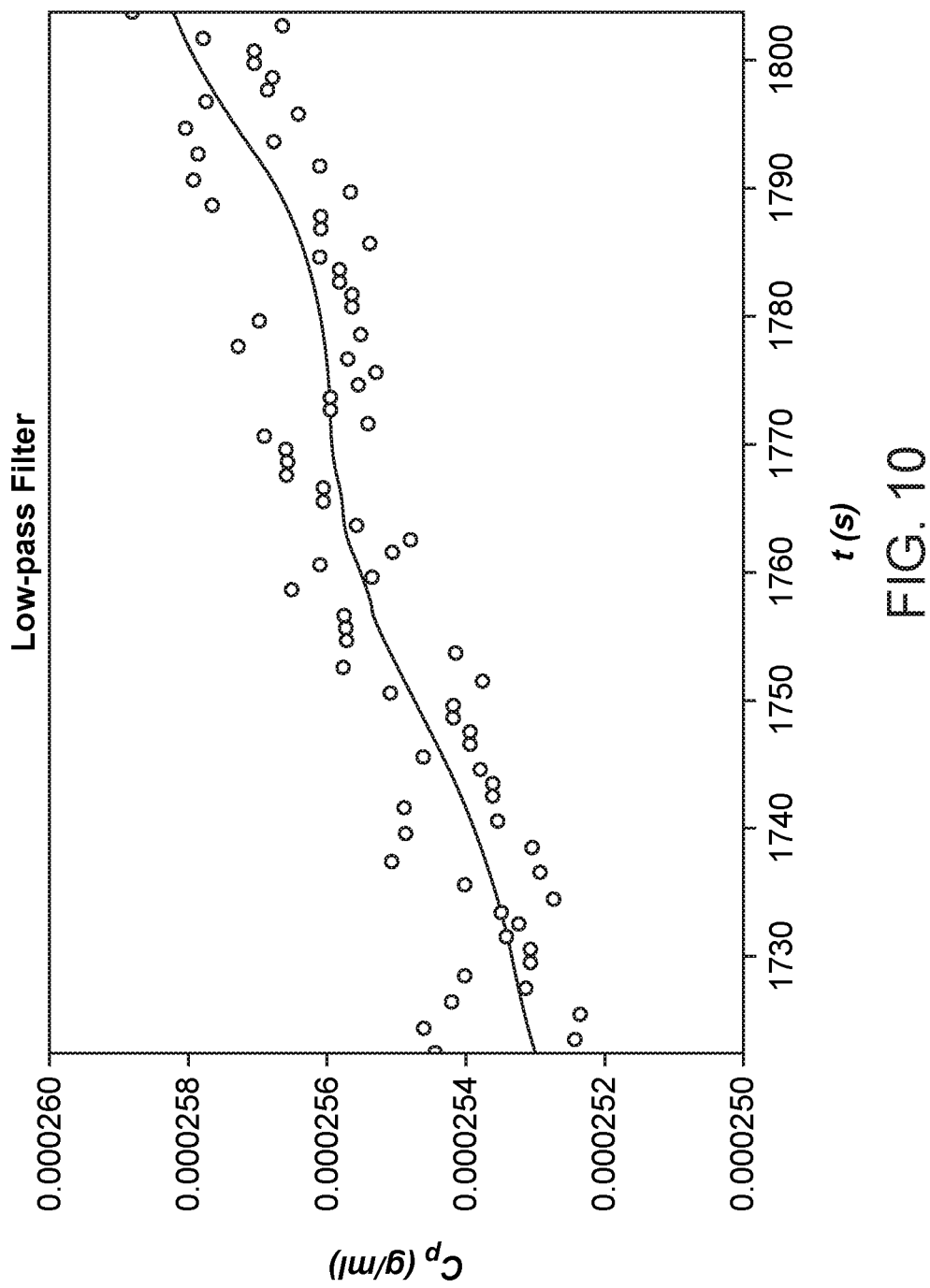
FIG. 10 illustrates the removal of high-frequency noise using a low-pass filter, according to an example embodiment of the present disclosure.

A low-pass filter can be applied to the signal to further reduce unwanted noise. For example, as shown in FIG. 10, a low-pass filter can remove high-frequency noise and the resultant signal can be used to calculate more reliable numerical derivatives. The filter design might be part of, but is not limited to, the classes of filter families including: elliptic (Cauer), Chebyshev types 1 and 2, Butterworth, and Savitzky-Golay.

Rather than running the signals continuously through filters, both $C_p$ and $M_w$ are filtered at the end of each resampled window. A typical filter might be a Butterworth filter of a low order with a cutoff frequency ranging anywhere from 0.5 Hz to 0.0001 Hz. The filter may be run forwards and backwards through the data set, removing the phase offset, in the manner of Matlab's zero-phase digital filter implementation. The zero-phase digital filter has the added benefit of minimizing error at the boundaries of the signal.

Least Squares Regression Fit Line

Figure 11:
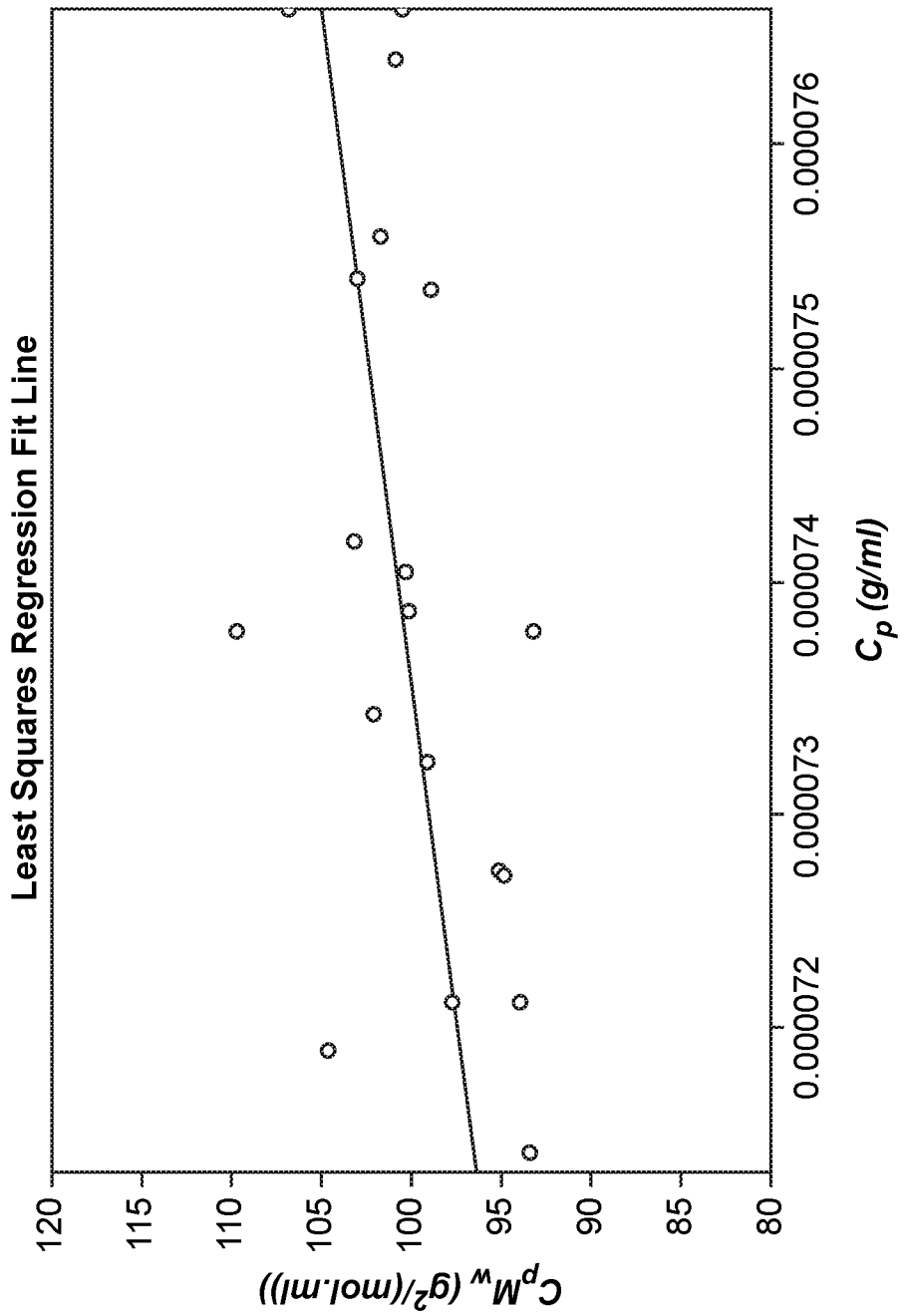
FIG. 11 illustrates a linear regression fit line showing the trend of $C_p M_w(C_p)$, according to an example embodiment of the present disclosure.
Figure 12:
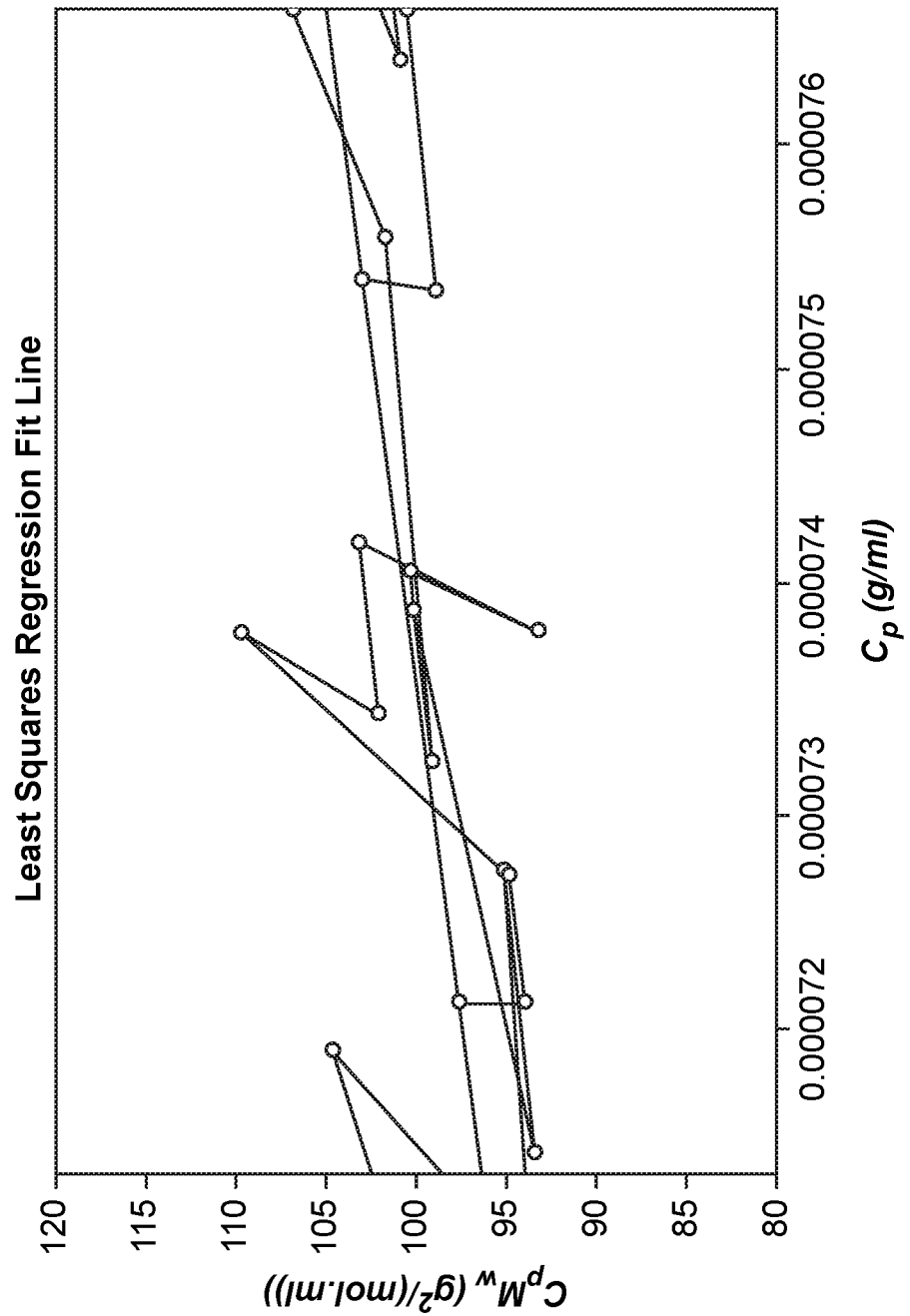
FIG. 12 illustrates a linear regression fit line showing the trend of $C_p M_w$ as a function of $C_p$, according to an example embodiment of the present disclosure.

Due to measurement noise, the measured values of $C_p$ do not constitute a monotonically increasing function, as illustrated in FIGS. 11 and 12. FIG. 11 illustrates a linear regression fit line showing the trend of $C_pM_w(C_p)$. The data points in FIG. 11 are disconnected for clarity. FIG. 12 illustrates a linear regression fit line showing the trend of $C_pM_w$ as a function of $C_p$. Because $C_p$ is not monotonic, the data points are not well ordered. The lines depict the evolution of the signal through time. Resampling the signal in $\Delta C_p$ allows a linear fit to be made to the available data.

Then $f(C_p)$ is not a function at all, where f, in this case, is the product of the signals $C_p$ and $M_w$. A regression technique, such as the least squares method, is used to estimate the true value of the function $f(C_p)$. Alternatively, a spline interpolation might be implemented to ensure continuity of the function $f(C_p)$.

Transitioning Techniques

Figure 13:
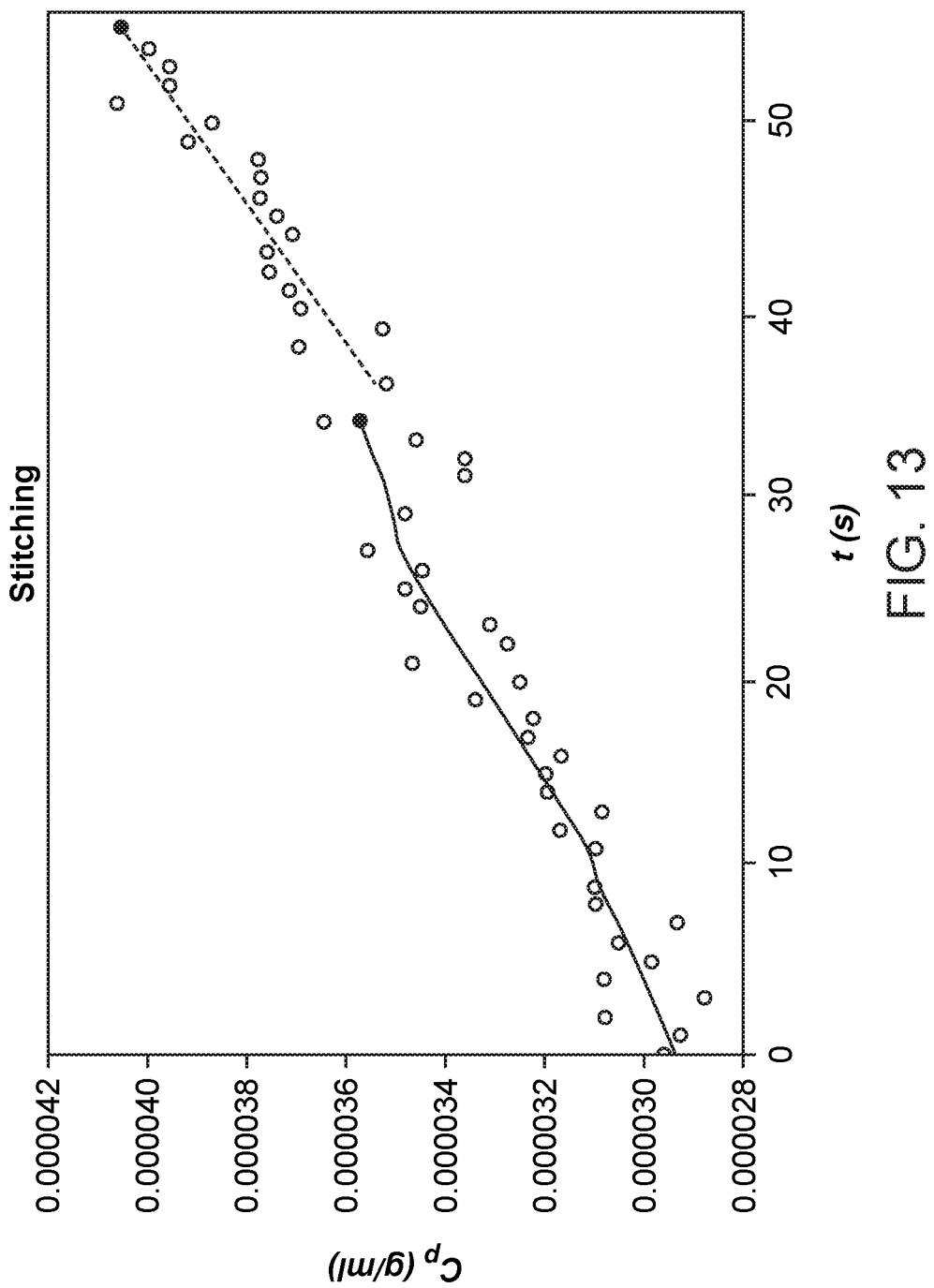
FIG. 13 illustrates data values approximated by a low-pass filter and data values approximated by linear regression, according to an example embodiment of the present disclosure.

The approximation method may vary between windows of data based on a decision rule. The approximation method may change as a function of time or polymer properties. In the case of multiple approximations being made simultaneously, a goodness of fit test can be used to determine the best one. As shown in FIG. 13, the values of the data in the first window are approximated by a low-pass filter while those in the second window are approximated by linear regression.

Batch Reaction Analysis

Polyacrylamide is formed by the polymerization of acrylamide in the presence of potassium persulfate as initiator. The batch reaction is performed by adding 0.3 g of potassium persulfate as initiator to 30 g of acrylamide as monomer dissolved in 1 L of water. The reactor temperature is held constant at 65° C. for the duration of the polymerization. A continuous stream of the reaction is diverted to ACOMP. The solution is diluted 80× in ambient temperature distilled water to stall the polymerization and reduce the concentration of polymer for accurate light scattering measurements. GPC analysis of an aliquot from the final product determines that the weight-average molecular weight is $M_w$=1.05×10$^6$ g/mol with a dispersity of $M_w/M_n$=1.68.

The transit time from the reactor to the UV detector is approximately 4 minutes. The concentration of monomer is determined by a UV absorption technique. The polymer concentration $C_p$ is determined by the diminution of the initial monomer concentration, as shown in A spline interpolation of $C_pM_w$ vs. $C_p$ can provide $M_{w,inst}$ values that are less subject to noise.

The transit time from the UV detector to the light scattering detector is 110 seconds. The light scattering detector measures the scattering intensities of five different angles. The absolute molecular weight $M_w$ is determined from these measurements by the partial Zimm plot technique. $M_w$ is shown as a function of time in FIG. 14C.

The delay between detectors is corrected so that the polymer concentration and molecular weight values correspond to the same sampled product. Because the $C_p$ signal precedes the $M_w$ signal, additional processing can be performed on the $C_p$ signal to provide a more accurate estimate of its value at the sampled time. The detector trains can be reorganized to make use of this foresight for the more problematic signals.

The values for $C_p$ and $M_w$ resampled in $\Delta C_p$ space can be independently selected via various approximation methods. For example, the filtered value may be preferred so long as the difference between the filtered value and the mean of the window is less than the standard deviation of the window, abs($M_{w,filtered}$−mean($M_{w,window}$))<std($M_{w,window}$). This selection method can be seen in FIGS. 14A and 14B, where silver triangles denote values derived from the linear regression approximation; dark gray triangles from the filtered approximation.

Recall that the instantaneous molecular weight is calculated thus, $$M_{w,inst} = \frac{d(C_p M_w)}{dC_p}.$$

Figure 14:
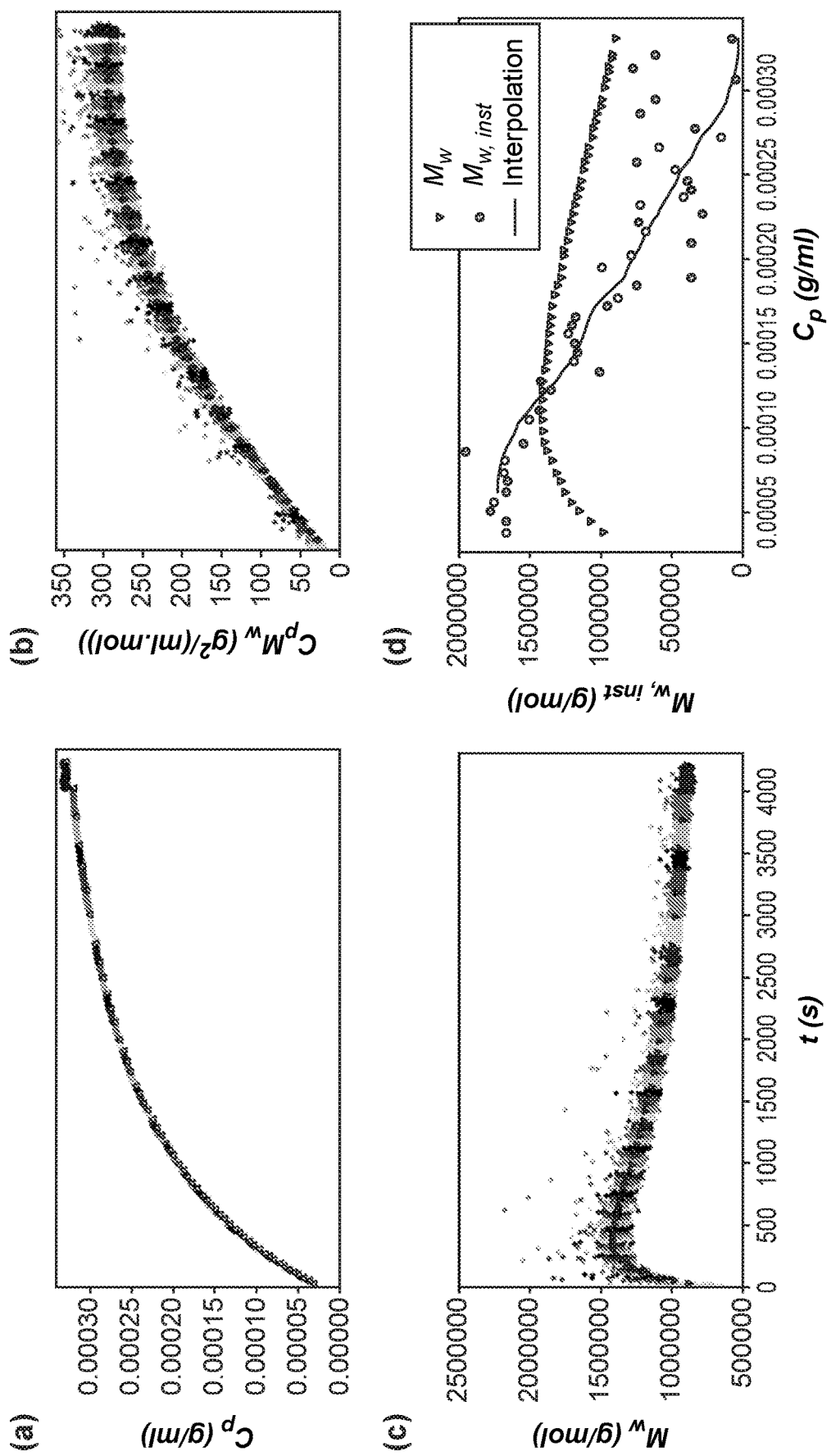
FIG. 14A illustrates polymer concentration increasing over time as a decaying exponential, as a result of polymerizing acrylamide at 65° C., according to an example embodiment of the present disclosure.
FIG. 14B illustrates the product of polymer concentration and molecular weight as a function of polymer concentration, as a result of polymerizing acrylamide at 65° C., according to an example embodiment of the present disclosure.
FIG. 14C illustrates molecular weight displayed as a function of time, as a result of polymerizing acrylamide at 65° C., according to an example embodiment of the present disclosure.
FIG. 14D illustrates the absolute molecular weight and the instantaneous molecular weight plotted as a function of polymer concentration, as a result of polymerizing acrylamide at 65° C., according to an example embodiment of the present disclosure.

The curve to be differentiated, $C_pM_w$ as a function of $C_p$, is shown in FIG. 14B. To recapitulate, the signals $C_p$ and $M_w$ are resampled according to $\Delta C_p$. The signals are then processed as functions of time, either by a filtering method, a linear regression method, etc. A further improvement could include various processing methods on $C_pM_w$ as a function of $C_p$, such as a low-pass filter to reduce jitter in the signal.

Then, $M_{w,inst}$ is calculated by a finite difference method. The backward different quotient, $$M_{w,inst} = \frac{(C_{p,i} M_{w,i}) - (C_{p,i-1} M_{w,i-1})}{(C_{p,i} - C_{p,i-1})},$$

where i denotes a $\Delta C_p$ resampled value, is used as a first approximation, but higher order corrections can be implemented. $M_{w,inst}$ as a function of $C_p$ is shown in FIG. 14D. The $M_w$ values are overlaid as a reference. The colors of the $M_{w,inst}$ values correspond to the previous resampled section, in accordance with the backward difference quotient.

A spline interpolation of $C_pM_w$ vs. $C_p$ can provide a further improvement to the computation of $M_{w,inst}$. A spline with appropriate an appropriate weighting function, polynomial degree, and smoothing factor can reduce small deviations that arise in the backward difference quotient. A rolling standard deviation can be implemented as a weighting function to reduce the weight of outlying points. The derivative of the spline can then generate a $M_{w,inst}$ curve, see FIG. 14D.

An instantaneous molecular weight distribution IMWD is generated at each $\Delta C_p$. The IMWD can be derived from various distributions, including, but not limited to, a log-normal distribution, and a geometric distribution. In this case, a log-normal distribution with a mean of $M_{w,inst}$ is used. The standard deviation is chosen to be the same as that of the molecular weight distribution for a polymer that is designed with a constant $M_w$, viz. $\sigma^2 = \ln M_w/M_n = \ln 1.3$. The amplitude of the distribution is the change in polymer concentration, $C_{p,i} - C_{p,i-1}$.

Figure 15:
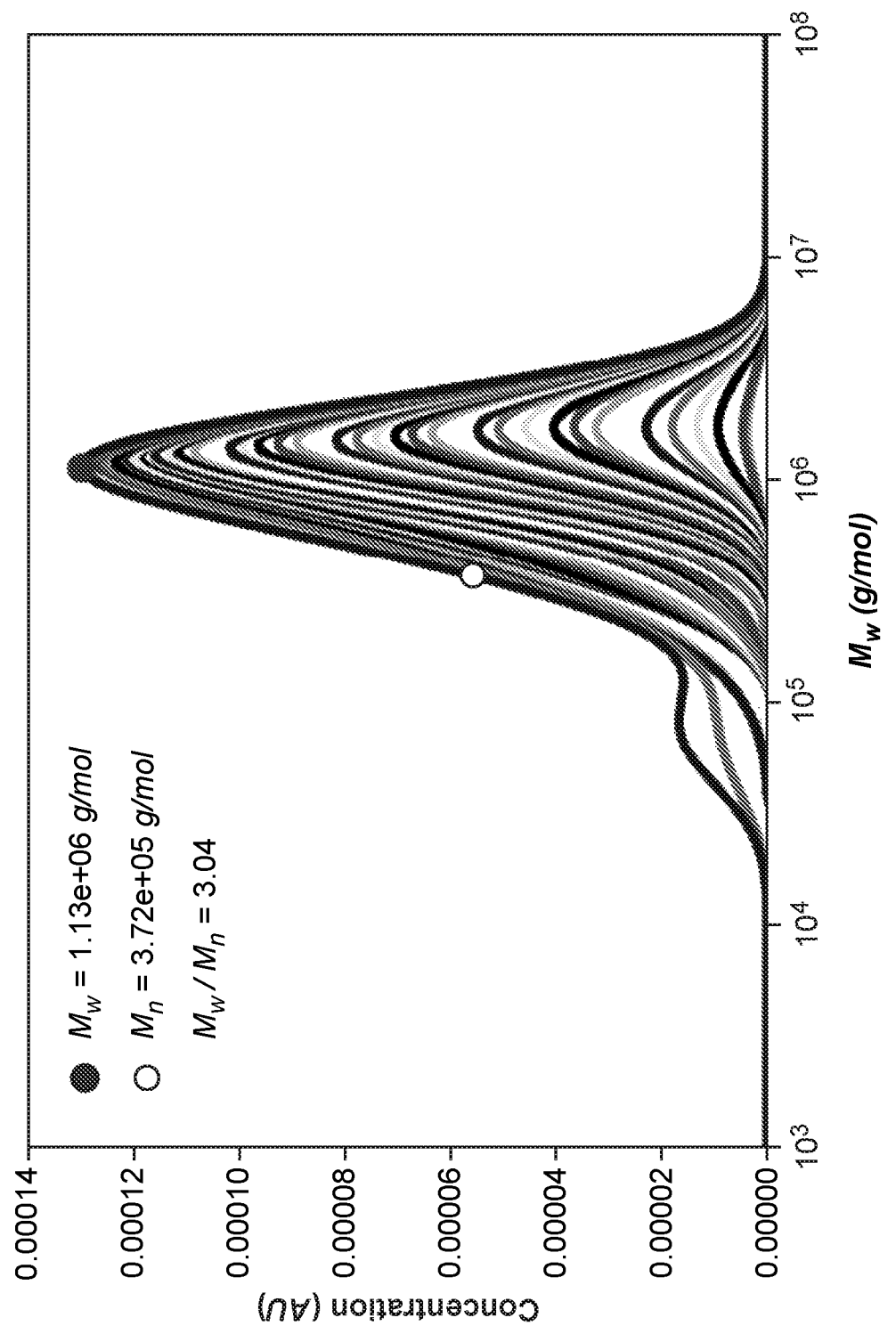
FIG. 15 illustrates intermediate CMWDs and final CMWD for acrylamide free radical polymerization at 65° C., according to an example embodiment of the present disclosure.

The IMWD is added to a cumulative molecular weight distribution CMWD. In this way, the polymer's growth can be monitored during its gestation, allowing it to be born fully characterized. Furthermore, a whole new field of engineered polymers is possible where changes in the experimental conditions can be made during the polymerization as the polymer evolves. The intermediate CMWDs and final CMWD are shown in FIG. 15 for the acrylamide free radical polymerization at 65° C.

For each IMWD and CMWD, the number-average $M_n$ and weight-average $M_w$ molecular weights can be calculated according to equations 34a and 34b, or their equivalent expressions in discrete form. The dispersity $M_w/M_n$ can be calculated at each $\Delta C_p$ through the reaction.

The evolution of the cumulative molecular weight distribution for the polymerization of acrylamide with potassium persulfate at 65° C. Each instantaneous molecular weight is taken as the mean of a log-normal distribution with a pre-determined standard deviation.

Figure 16:
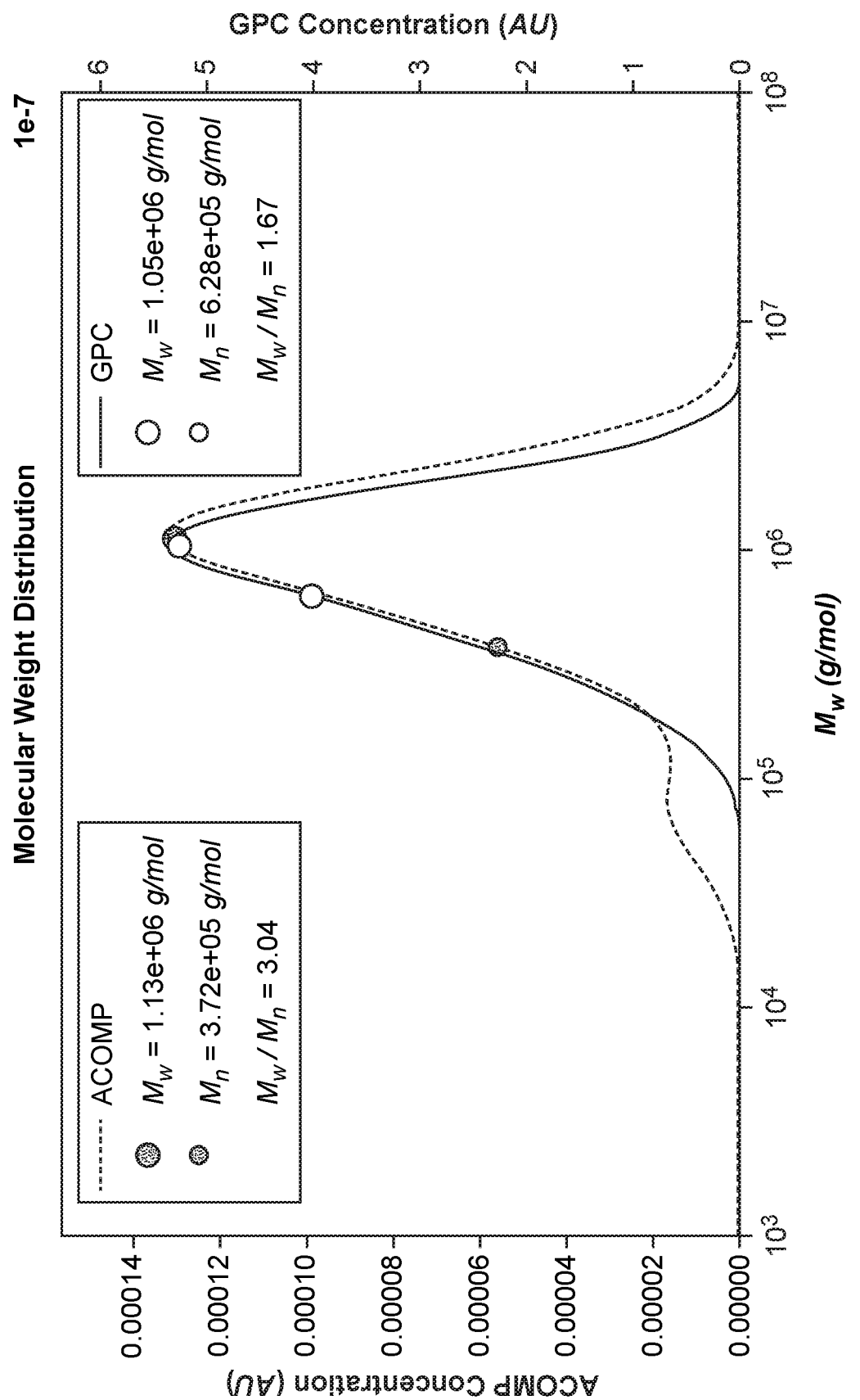
FIG. 16 illustrates the comparison of the final CMWD to the MWD from GPC, according to an example embodiment of the present disclosure.

The final CMWD is compared to the MWD from GPC in FIG. 16. The weight-average molecular weights are very close at $1.13 \times 10^6$ g/mol from ACOMP and $1.05 \times 10^6$ g/mol from GPC. Due to small $M_{w,inst}$ values, the CMWD has a low molecular weight knee that reduces the number-average molecular weight $M_n$ and increases the SFM-derived dispersity by nearly two times.

A comparison of molecular weight distributions from ACOMP and GPC. The final CMWD from ACOMP has a weight-average molecular weight that is very close to that of GPC. The number-average molecular weight from ACOMP is lower, which causes a higher dispersity.

Semibatch Reaction Analysis

Figure 17:
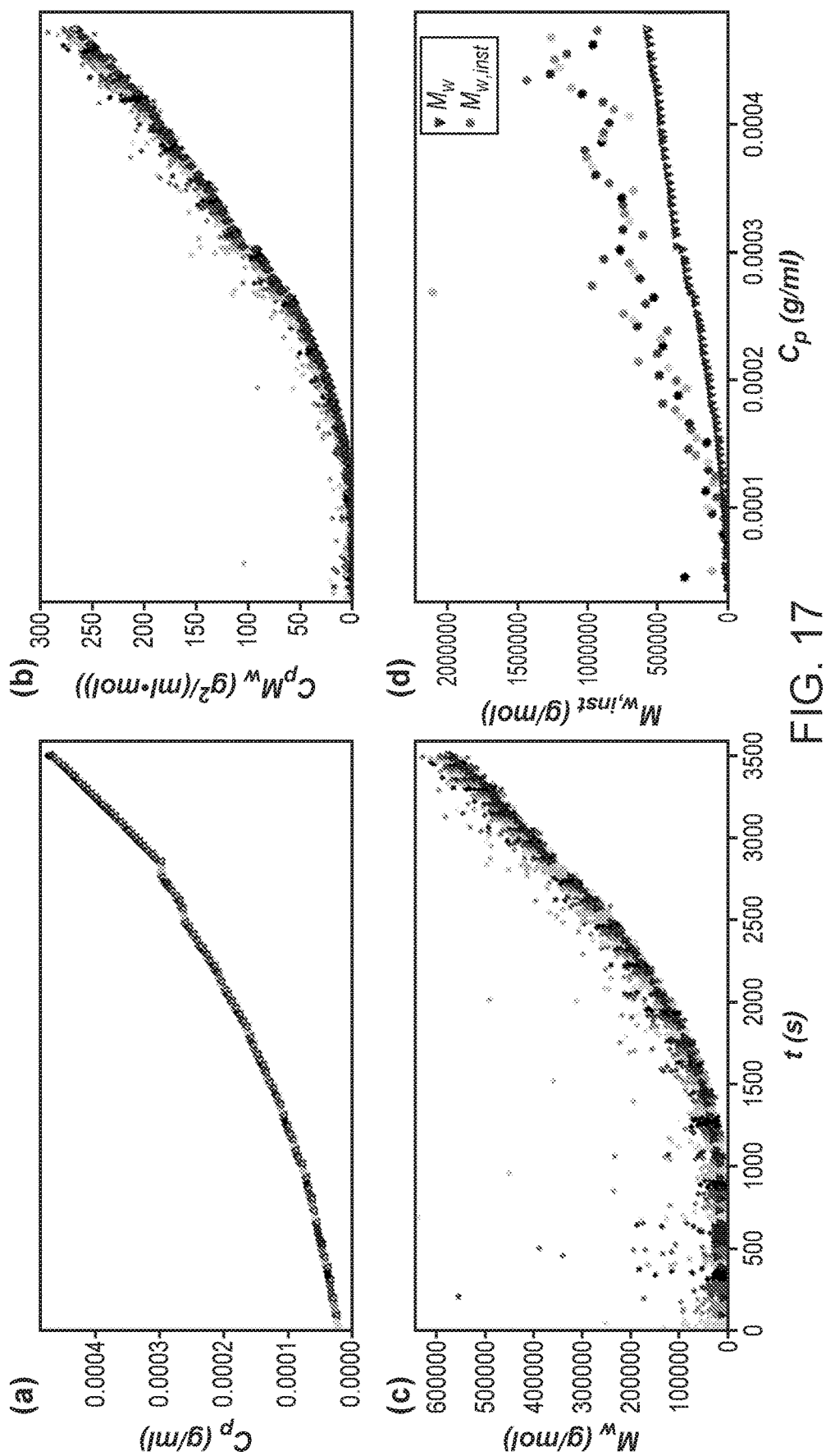
FIG. 17A illustrates the polymer concentration as a function of time for the semibatch polymerization of polyacrylamide, according to an example embodiment of the present disclosure.
FIG. 17B illustrates the product of $C_p$ and $M_w$ as a function of $C_p$ for the semibatch polymerization of polyacrylamide, according to an example embodiment of the present disclosure.
FIG. 17C illustrates $M_w$ as a function of time for the semibatch polymerization of polyacrylamide, according to an example embodiment of the present disclosure.
FIG. 17D illustrates $M_w$ and $M_{w,inst}$ as functions of $C_p$ for the semibatch polymerization of polyacrylamide, according to an example embodiment of the present disclosure.

In this semibatch reaction, polyacrylamide is formed in the presence of potassium persulfate by continuously adding monomer to the reactor. FIG. 17 illustrates the reaction results for the semibatch polymerization of polyacrylamide. FIG. 17A illustrates the polymer concentration as a function of time. FIG. 17B illustrates the product of $C_p$ and $M_w$ as a function of $C_p$. FIG. 17C illustrates $M_w$ as a function of time. FIG. 17D illustrates $M_w$ and $M_{w,inst}$ as functions of $C_p$. The initial monomer concentration is 0 g/ml. The monomer flow rate is chosen to let $M_w$ increase linearly, as seen in FIG. 17D. $M_w$ rises linearly as the reaction progresses. There is a linear trend in the $M_{w,inst}$. The $M_{w,inst}$ is consistently higher than the current $M_w$. A spline interpolation of the $M_{w,inst}$ values assists the operator in understanding the trend of the instantaneous molecular weight.

Figure 18:
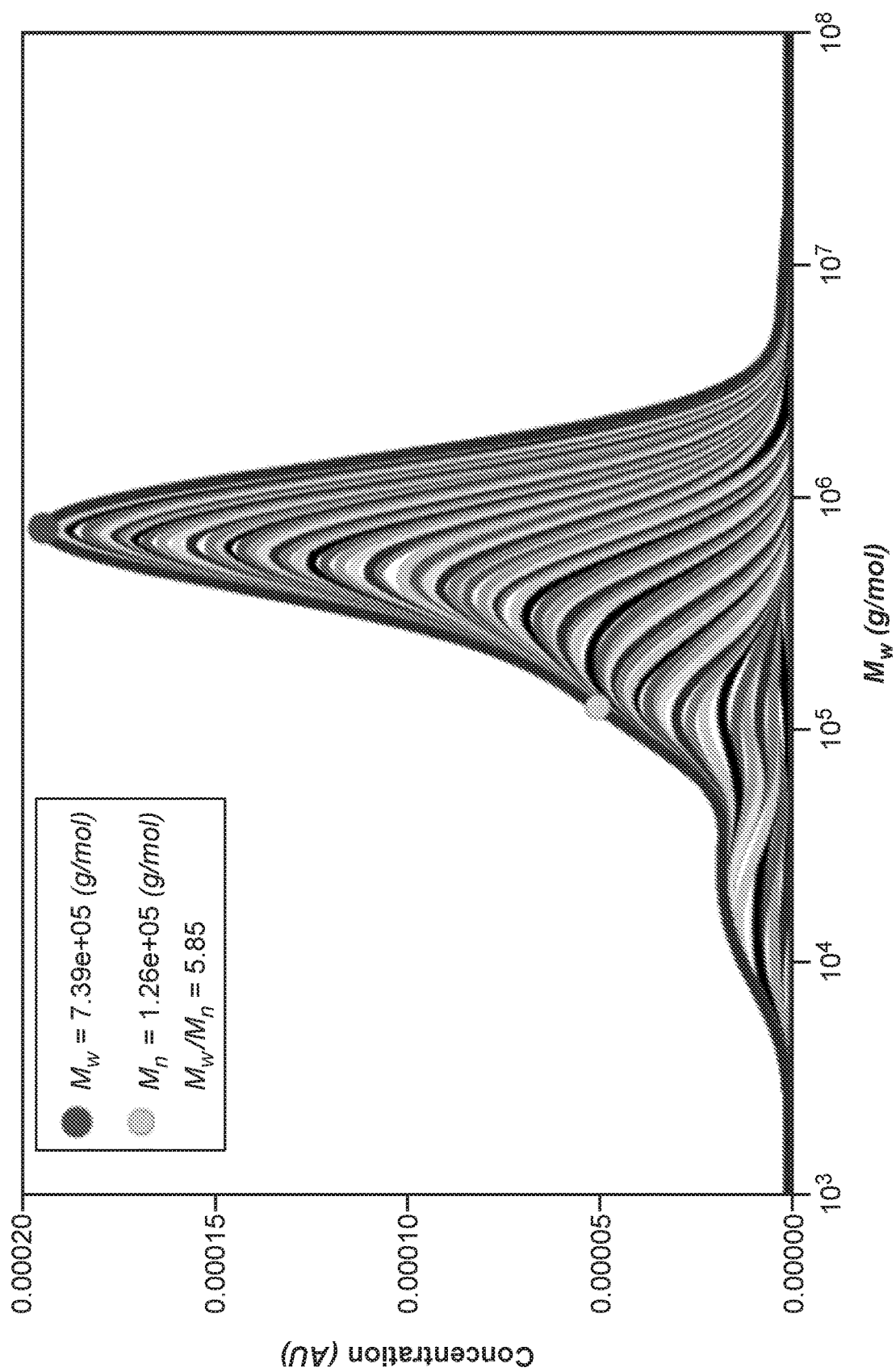
FIG. 18 illustrates cumulative molecular weight distribution generated from $M_{w,inst}$, according to an example embodiment of the present disclosure.

The cumulative molecular weight distribution generated from $M_{w,inst}$ is shown in FIG. 18. The molecular weight distribution begins with a mean near $10^4$ g/mol. As the polymer concentration increases, the molecular weight distribution shifts to a higher weight-average molecular weight of $7.39 \times 10^5$ g/mol.

The evolution of the cumulative molecular weight distribution for a semibatch polymerization of acrylamide with potassium persulfate at 55° C. Continuous addition of monomer to the reactor causes the molecular weight to linearly increase, as can be seen by the shifting mean of the distribution as polymer concentration increases.

Semibatch-to-Batch Reaction Analysis

Figure 19:
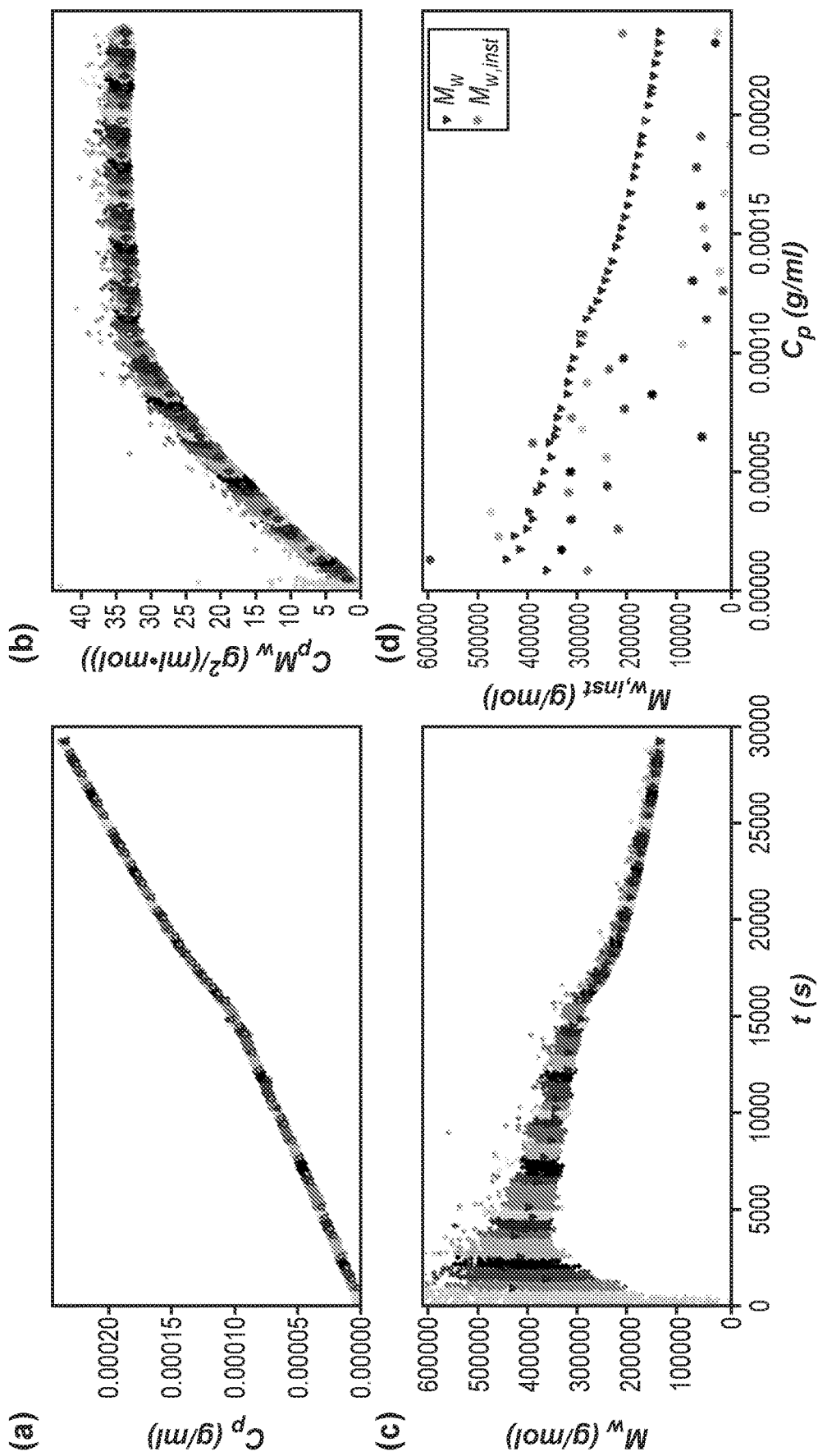
FIG. 19A illustrates polymer concentration as a function of time, for a semibatch-to-batch polymerization of polyacrylamide, according to an example embodiment of the present disclosure.
FIG. 19B illustrates the product of $C_p$ and $M_w$ as a function of $C_p$, for a semibatch-to-batch polymerization of polyacrylamide, according to an example embodiment of the present disclosure.
FIG. 19C illustrates $M_w$ as a function of time, for a semibatch-to-batch polymerization of polyacrylamide, according to an example embodiment of the present disclosure.
FIG. 19D illustrates $M_w$ and $M_{w,inst}$ as functions of $C_p$, for a semibatch-to-batch polymerization of polyacrylamide, according to an example embodiment of the present disclosure.

In this semibatch reaction, polyacrylamide is formed in the presence of potassium persulfate by continuously adding monomer to the reactor. After a time, the monomer feed is stopped and the polymerization is allowed to continue as a batch reaction. The growth rate of polymer concentration and molecular weight change when the monomer feed is turned off, as shown in FIGS. 19A and 19C. FIG. 19 illustrates reaction results for a semibatch-to-batch polymerization of polyacrylamide. FIG. 19A illustrates polymer concentration as a function of time. FIG. 19B illustrates the product of $C_p$ and $M_w$ as a function of $C_p$. FIG. 19C illustrates $M_w$ as a function of time. FIG. 19D illustrates $M_w$ and $M_{w,inst}$ as functions of $C_p$. $M_w$ rises decreases throughout the reaction. $M_{w,inst}$ decreases for the first half of the reaction and then stays near zero for the second half. The trend in $M_{w,inst}$ changes from decreasing during the semibatch portion of the reaction to being near zero in the batch portion.

Figure 20:
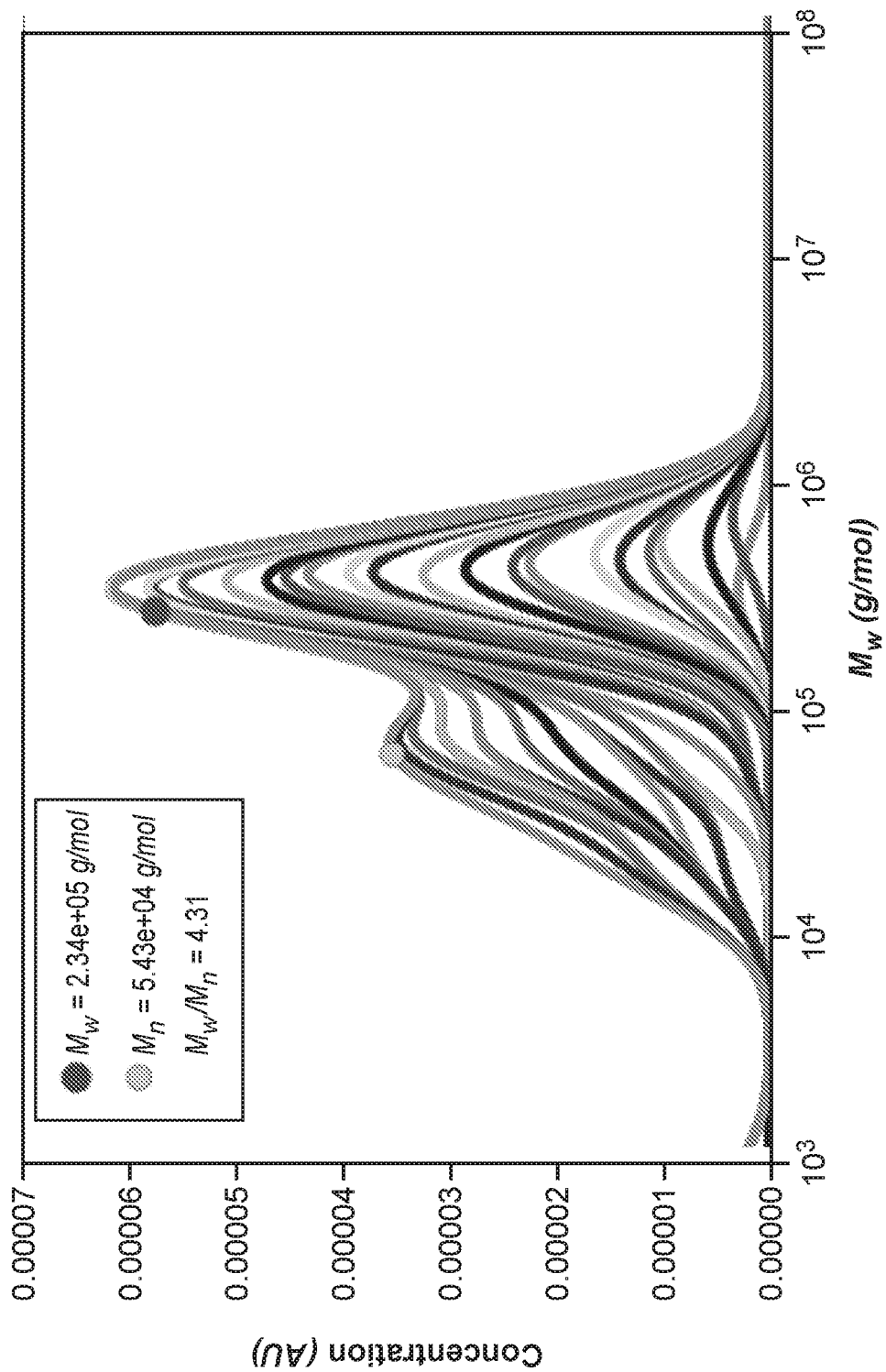
FIG. 20 illustrates the evolution of the cumulative molecular weight distribution for a semibatch polymerization of acrylamide with potassium persulfate at 65° C. that is allowed to continue polymerizing after the monomer feed is turned off, according to an example embodiment of the present disclosure.

The transition from semibatch to batch causes a change in polymerization dynamics that becomes apparent in the CMWD. FIG. 20 illustrates the evolution of the cumulative molecular weight distribution for a semibatch polymerization of acrylamide with potassium persulfate at 65° C. that is allowed to continue polymerizing after the monomer feed is turned off. As depicted in FIG. 20, the change in polymerization dynamics exhibits itself in the CMWD as a bimodal distribution. The first half of the reaction creates polymers roughly centered around $3.5 \times 10^5$ g/mol. The second half creates much smaller polymers, causing a bimodal distribution to arise.

The evolution of the cumulative molecular weight distribution for a semibatch polymerization of acrylamide with potassium persulfate at 65° C. that is allowed to continue polymerizing after the monomer feed is turned off. The change in polymerization dynamics exhibits itself in the CMWD as a bimodal distribution.

Polymer Reaction Control

ACOMP allows control of reaction kinetics, reduced viscosity, and molecular weight, using initiator and monomer feeds into the reactor, as well as other agents such as chain transfer agents, cross-linking and branching agents, inhibitors, and quenchers, in addition to temperature. In achieving this type of control, variables measured by ACOMP such as polymer and monomer concentration, $M_w$, reduced viscosity and $M_{w,inst}$ and instantaneous reduced viscosity are used and manipulated by the above listed control agents to follow a desired reaction trajectory. Currently, work is underway to allow automatic active control in this fashion, using multiloop controller feedback.

Similarly, the availability of IMWD and CMWD as they evolve during the reaction allows targeted final CMWD to be reached. In order to do this, offline computations will normally be used to determine the final desired CMWD, which yields desired endproduct properties of the polymer. Then, during the reaction the evolving CMWD can be assessed against the final CMWD and reactor conditions changed in order to converge towards the CMWD by the end of the reaction. In some instances offline computations will provide IMWD and this will allow a better control of the final CMWD, since the current IMWD furnished by the ACOMP data can be compared to the offline computed IMWD and adjustments made to reaction conditions to keep the subsequent IMWD as close to the offline computed ones as possible.

Figure 21:
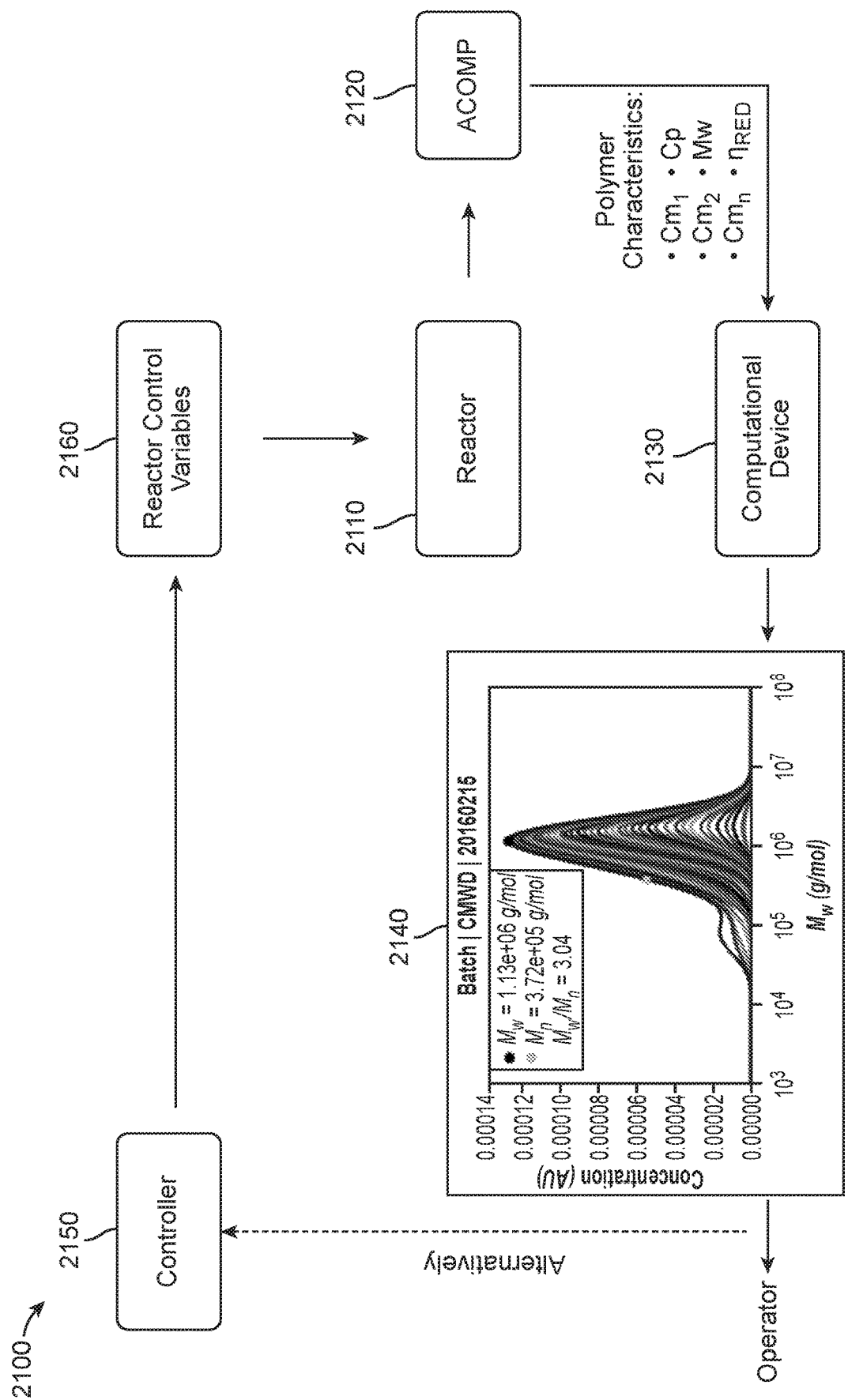
FIG. 21 illustrates a device for determining molecular weight distributions without chromatographic or other physical separation, according to an example embodiment of the present disclosure.

FIG. 21 depicts a device 2100 for determining molecular weight distributions without chromatographic or other physical separation as described herein. The reaction takes place in the reactor 2110. As depicted in FIG. 21, the device 2100 includes an ACOMP system 2120, such as the ACOMP system 100 depicted in FIG. 1, coupled to the reactor 2110. The ACOMP system 2120 includes a pump to continuously withdraw a sample stream from the reactor, and dilute it to a desired level, typically between $10^{-4}$ g/cm$^3$ and $10^{-2}$ g/cm$^3$. The diluted ACOMP stream passes through the ACOMP detectors for measuring molecular weight and/or reduced viscosity. The former typically comprises a total intensity light scattering device with a concentration detector, such as, but not limited to, an ultra-violet spectrophotometer, refractometer, conductivity sensor, polarimeter, Raman scattering, or infra-red or other electromagnetic absorption and/or scattering sensor. The reduced viscosity measurement can be made with a viscometer, such as the single capillary type using a differential pressure transducer, see for example D. P. Norwood, W. F. Reed "Comparison of Single Capillary and Bridge Viscometers as Size Exclusion Chromatography Detectors", Int. J. Polym. Ana. and Char., 4, 99-132, 1997, where the concentration can be measured in the same way as was mentioned in conjunction with the light scattering detector. The ACOMP analysis module combines all incoming detector signals from the ACOMP detector train and continuously computes the monomer concentration, or the concentrations of comonomers when multiple monomers are used, the concentration of polymer, the weight average molecular weight $M_w$ and the weight average reduced viscosity $\eta_{w,r}$.

ACOMP measurements are normally made at a polymer concentration low enough that $\eta_{w,r}$ is essentially equal to the weight average intrinsic viscosity $[\eta]_w$. The polymer characteristics measured by the ACOMP system 2120 are then transmitted to a computational device 2130 communicatively coupled with the ACOMP system 2120. The computational device 2130 may be, for example, a microcomputer or programmable logic controller, capable of computing the instantaneous weight average molecular weight $M_{w,inst}$ as frequently as needed. The computational device 2130 may also be configured to compute the instantaneous weight average reduced viscosity $\eta_{w,r,inst}$, which at ACOMP concentration are normally equal to the instantaneous weight average intrinsic viscosity $[\eta]_{w,inst}$. Upon each computation of $M_{w,inst}$ the corresponding MWD can be computed using a mathematical distribution, such as, but not limited to, those discussed above. These MWD keep accumulating and adding onto each other. By the end of the reaction the sum of all MWD during the reaction equals the MWD of the final product. Similarly, intrinsic viscosity distributions (IVD) can be computed as often as needed or desired, and the IVD keep accumulating until, by the end of the reaction, the sum of all IVD equals the IVD of the final product.

Similarly, where copolymers are being produced in the reactor, the computational device 2130 can use the concentrations of each monomer at each instant to compute the instantaneous fraction of each monomer type in the polymer chains produced at that instant. From this, models for instantaneous composition distributions can be applied so that the instantaneous composition distribution (ICD) is computed. Each ICD is summed with the others as they are produced so that the ICD of the final polymer is obtained.

The computational device 2130 may be coupled to a graphical display 2140 or other means for conveying the computational output of the computational device 2130 to a user. Based on the computational output of the computational device 2130, the user may manipulate a controller 2150, coupled with reactor 2110, that is capable of controlling the reactor control variables 2160. Reactor control variables 2160 may include, for example, mixing rate, temperature, rate of flow of reagents from external reservoirs into the reactor including, but not limited to, monomers and comonomers, initiators, chain transfer agents, branching agents, crosslinking agents, quenchers, and gases, such as oxygen, nitrogen, and air, and the input of radiation into the reactor, such as ultra-violet radiation for inducing photopolymerization. Alternatively, for automatic control, the computational device 2130 may be communicatively coupled with controller 2150. In such cases, the computational device 2130 is configured to transmit computational output directly to the controller 2150. The computational output from computational device 2130 may include, for example, instantaneous weight average molecular weight $M_{w,inst}$, instantaneous weight average reduced viscosity $\eta_{w,r,inst}$, intrinsic viscosity distributions (IVD), the instantaneous fraction of each monomer type in the polymer chains, and instantaneous composition distribution (ICD), as well as cumulative values of $M_w$ and $\eta_{w,r}$, and composition. The controller 2150 may be configured to automatically control the reactor control variables 2160 of reactor 2110, based on the computational output received at the controller 2150.

Details on how active control have been achieved both manually and automatically have been given in Terry McAfee, Natalie Leonardi, Rick Montgomery, Julia Siqueira, Thomas Zekoski, Michael F. Drenski, Wayne F. Reed, "Automatic control of polymer molecular weight during synthesis", Macromolecules, 49 (19), 7170-7183, 2016, DOI: 10.1021/acs.macromol.6b01522. In this work, however, only average values were used for control, not the full distributions computed by the current device and methods. The current device and methods will provide a higher level of control over complete final polymer product distributions than just the average values detailed in this latter publication.

MWD for Multimodal Polymer Synthesis

A multimodal distribution is a probability distribution with more than one peak or mode. The ACOMP/Controller Interface (ACOMP/CI) is used for the automatic, subsequent production of multimodal populations during the free radical chain growth polymerization of acrylamide. The multimodal populations are produced by controlling monomer and chain transfer agent (CTA) feed rates into the reactor. Monomer concentration in the reactor is kept constant throughout the duration of a mode until a desired polymer concentration is achieved. Once the first mode is completed an automatic injection of chain transfer agent is fed in to the reactor. The monomer concentration is maintained constant throughout the duration of the subsequent mode until the reaction is ended or a second addition of chain transfer agent is fed in to the reactor to produce a third mode.

Figure 22:
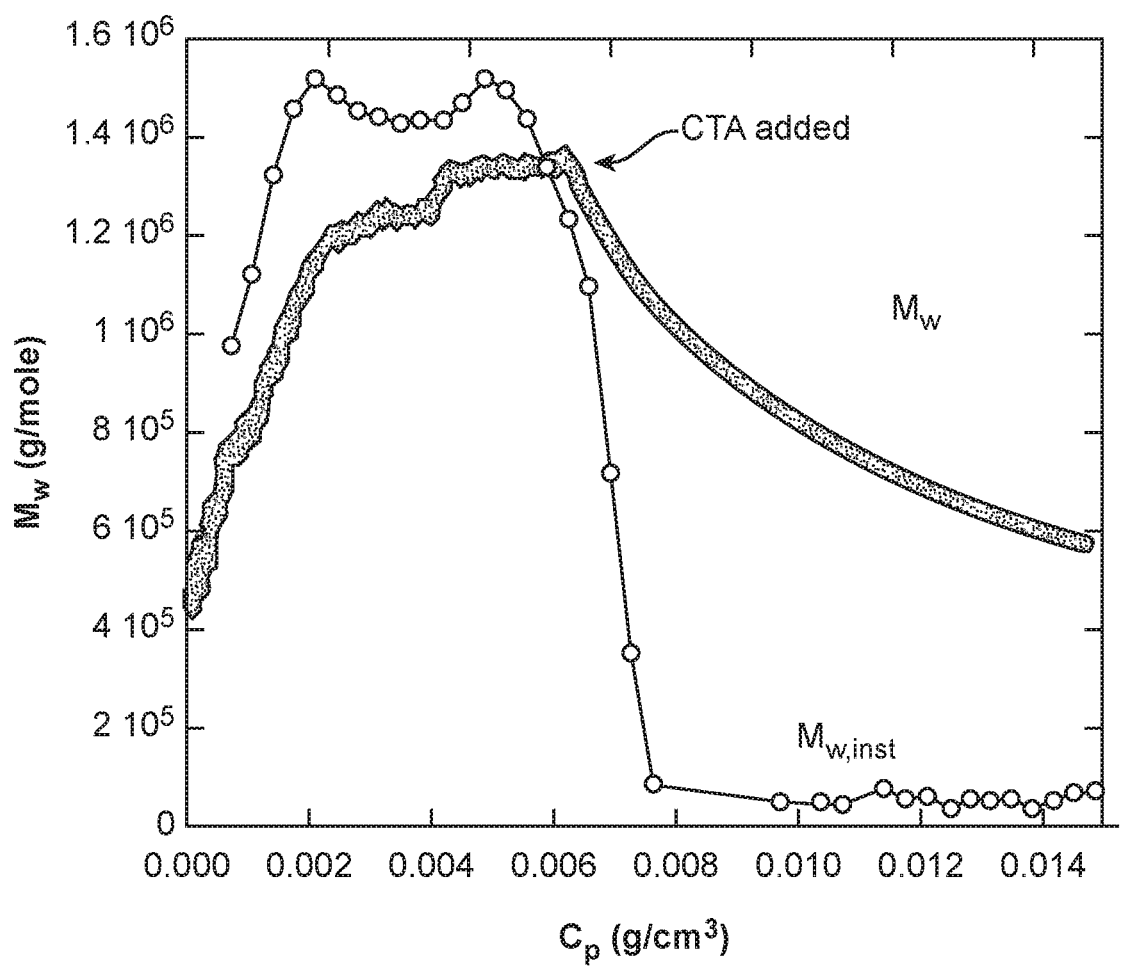
FIG. 22 illustrates the effect of chain transfer on $M_w$ and $M_{w,inst}$, according to an example embodiment of the present disclosure.

FIG. 22 shows the effect of chain transfer on $M_w$ and $M_{w,inst}$. The addition of chain transfer agent has a clear effect on $M_{w,inst}$ where a precipitous drop is observed with the addition of CTA until the subsequent steady state $M_{w,inst}$ is reached. The $M_{w,inst}$ is used for the calculation of the MWD.

Figure 23:
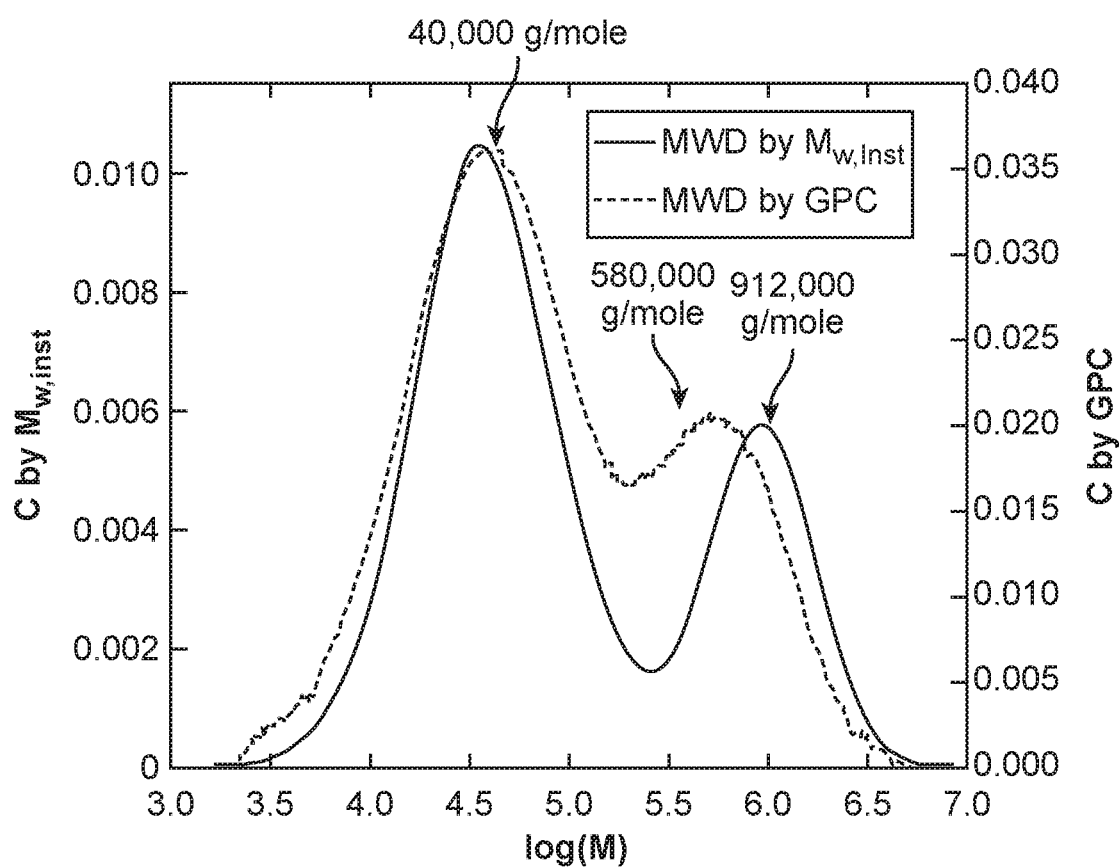
FIG. 23 illustrates the resulting bimodal MWD, according to an example embodiment of the present disclosure.

FIG. 23 shows the resulting bimodal MWD. Shown in black is the MWD as measured and computed using the chromatography-free methodology and shown in blue is the polyethylene oxide (PEO) equivalent MWD as measured using Gel Permeation Chromatography (GPC). The results closely match and greater resolution between modes is obtained using the method described herein.

$M_w$ and Composition Distributions for Copolymerization Reactions

Molecular weight distributions can also be generated for copolymerization reactions. The differences in UV absorption spectra for different monomer species allow ACOMP to monitor the conversion of each monomer into polymer. The total polymer concentration c is used with the light scattering detector to produce a molecular weight M of the copolymer. The instantaneous molecular weight $M_{w,inst}$ is computed in the usual way, $$M_{w,inst} = \frac{d(c_p M_w)}{dc_p} \quad (39)$$

It is noted that when light scattering is used to compute $M_w$, and hence also $M_{w,inst}$, a different procedure from the standard Zimm approach is needed. A realtime method for computing molecular weight by light scattering for copolymers was published in P. Enohnyaket, T. Kreft, A. M. Alb, M. Drenski, W. F. Reed, "Determination of molecular mass during online monitoring of copolymerization reactions", Macromolecules, 40, 8040-8049, 2007.

Figure 24:
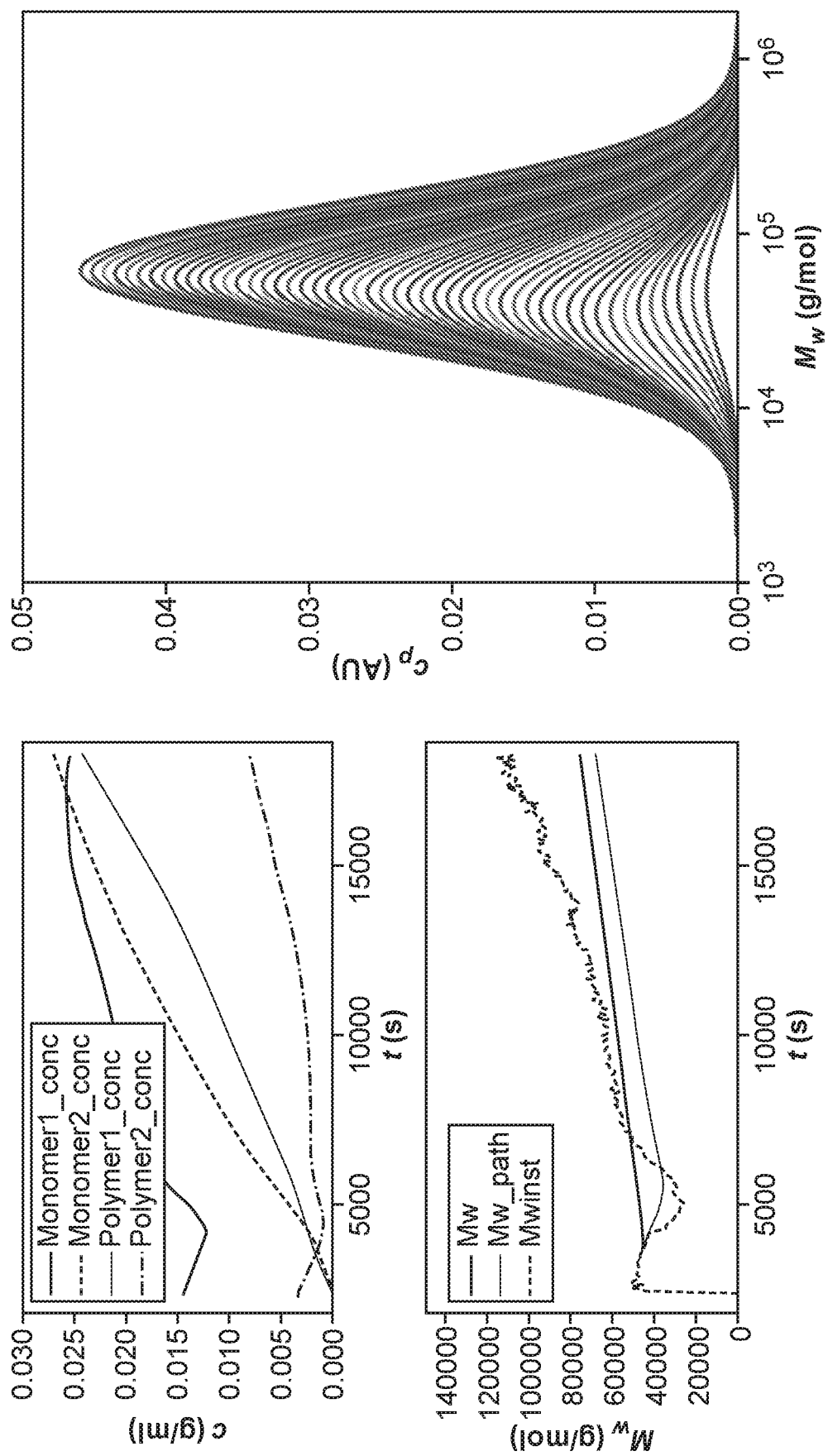
FIG. 24 illustrates the development of polymer properties during a copolymerization reaction, according to an example embodiment of the present disclosure.

FIG. 24 shows the development of polymer properties during a copolymerization reaction. Top-left: The monomer and polymer concentrations are plotted against time. Bottom-left: Cumulative weight-average molecular weight $M_w$ is plotted alongside the control trajectory Mw_path. Also shown is the instantaneous weight-average molecular weight $M_{w,inst}$. Right: The evolution of the cumulative molecular weight distribution shows the shift towards longer polymer chains (distribution shifts right) as the reaction progresses (lines stack up).

The instantaneous fractional composition provided by ACOMP is the average composition of polymer being produced at a given instant. The Stockmayer bivariate distribution is invoked to provide the distribution from which that average comes. Let $L_{inst}$ be the instantaneous number-average length of live radical chains, $$L_{inst} = M_{w,inst}/\langle m \rangle \quad (40)$$

where $\langle m \rangle$ is the average molecular weight of the monomers producing polymer at that instant, $$\langle m \rangle = F_A m_A + F_B m_B \quad (41)$$

Because the molecular weight distribution is computed with its own distribution function, the Stockmayer distribution w(u) is simplified to focus solely on the composition distribution u centered around the average instantaneous fraction of monomer species A, $u = F - F_A$ $$w(u) = L_{inst} \exp(-L_{inst}) \frac{1}{\sqrt{2\pi\beta/L_{inst}}} \exp\left(-\frac{u^2 L_{inst}}{2\beta}\right) \quad (42)$$

where $\beta = F_A F_B \sqrt{1 + 4 F_A F_B (r_A r_B - 1)}$ with $r_{A,B}$ as the reactivity ratios. w is then normalized.

The instantaneous composition distribution w is summed with the previous distributions $w_0, \ldots, w_{i-1}$, each weighted by the change in polymer concentration increase over which it was computed so that the cumulative composition distribution is $$CCD = \Sigma \Delta(c_p)_i w_i \quad (43)$$

Figure 25:
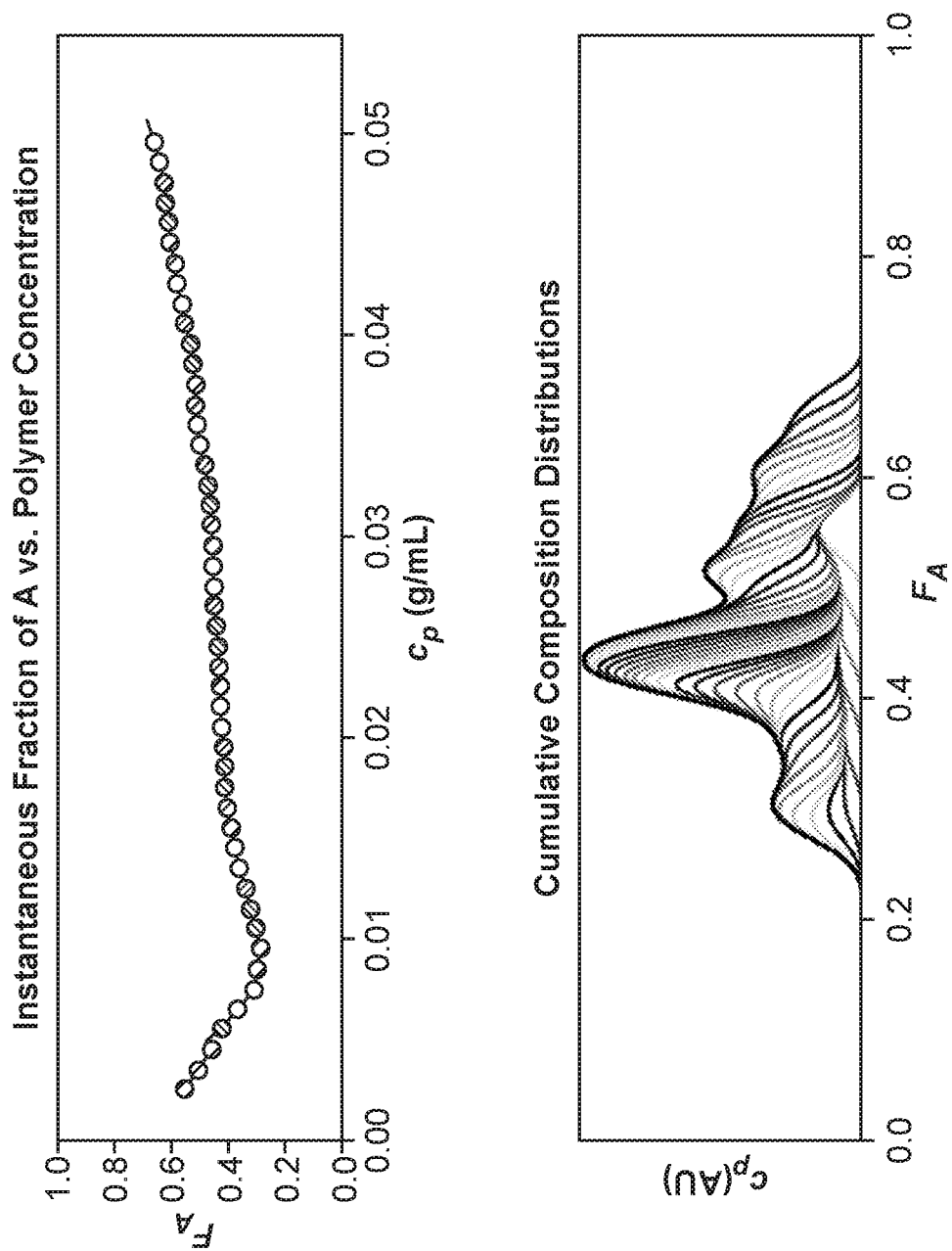
FIG. 25 illustrates the instantaneous fraction of monomer species A incorporated into polymer over time, according to an example embodiment of the present disclosure.

FIG. 25 (top panel) shows the instantaneous fraction of monomer species A incorporated into polymer over time. The evolution of the cumulative composition distribution is shown at bottom (lower panel).

Comparison of MWD by ACOMP and GPC for Copolymerization Reactions

The cumulative MWD produced by ACOMP during the reaction is shown next to be more accurate than that produced by GPC in post-processing for the copolymerization of styrene sulfonate and acrylamide. ACOMP has the additional benefit of tracking $M_{w,inst}$ during conversion. $M_{w,inst}$ provides insight into the makeup of the polymer that can be lost in the resolution limits of the GPC equipment. Furthermore, because the GPC is calibrated using PEO standards, the molecular weight calculations can have large error for any polymers that deviate in architecture from the standards.

Figure 26:
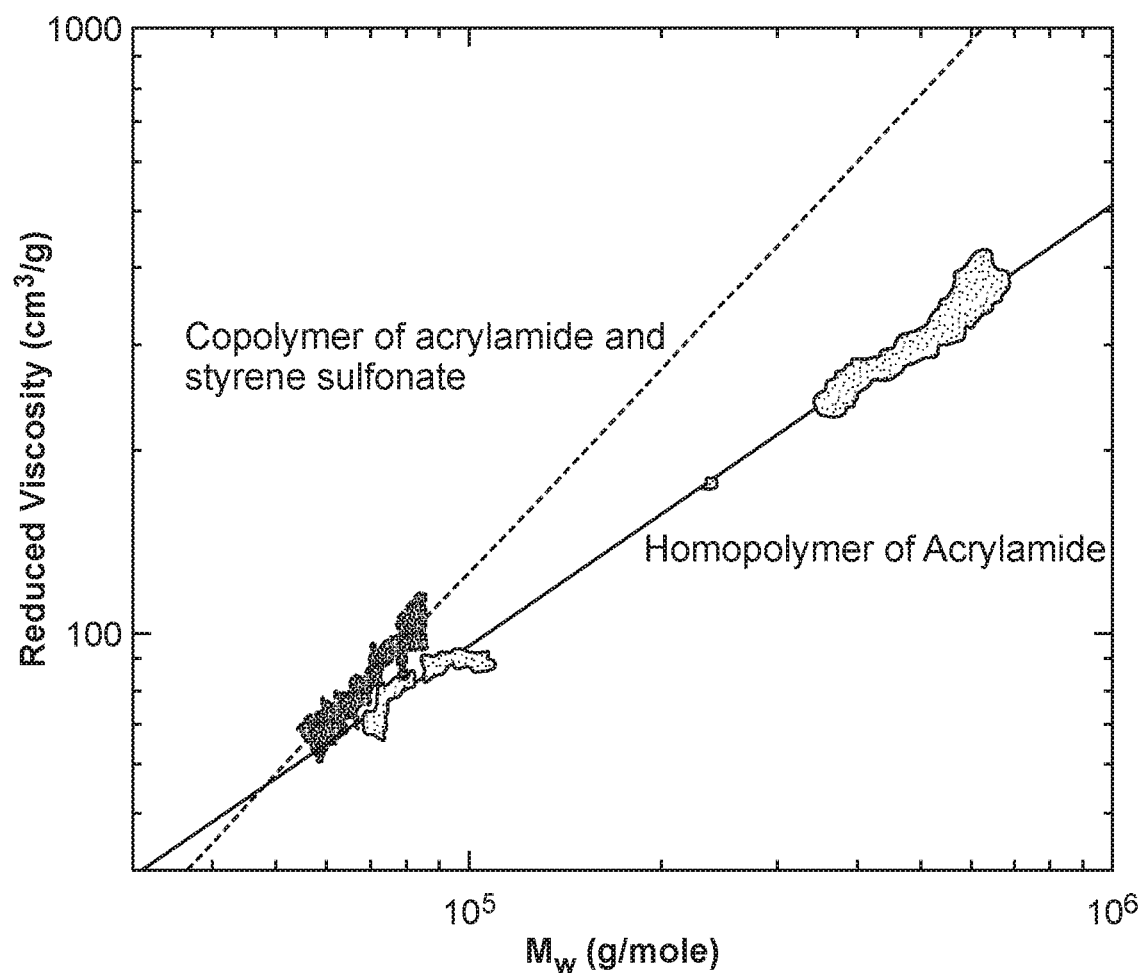
FIG. 26 illustrates that the reduced viscosity of the copolymer increases more rapidly with molecular weight than does pure polyacrylamide, according to an example embodiment of the present disclosure.

FIG. 26 shows that the reduced viscosity of the copolymer increases more rapidly with molecular weight than does pure polyacrylamide and the copolymer has a higher hydrodynamic volume for any given molecular weight than polyacrylamide of the same molecular weight. This is due to the electrostatic repulsion of the negatively charged SS groups in the copolymer. The PEO standards behave more similarly to polyacrylamide, both PEO and polyacrylamide being electrically neutral polymers, as shown by the good agreement between GPC and ACOMP results presented elsewhere in this disclosure (e.g., FIG. 8). This higher reduced viscosity means that the copolymer will pass through the GPC columns more quickly than a PEO or polyacrylamide of the same molecular weight, thus being reported as a higher molecular weight particle in the GPC MWD.

Figure 27:
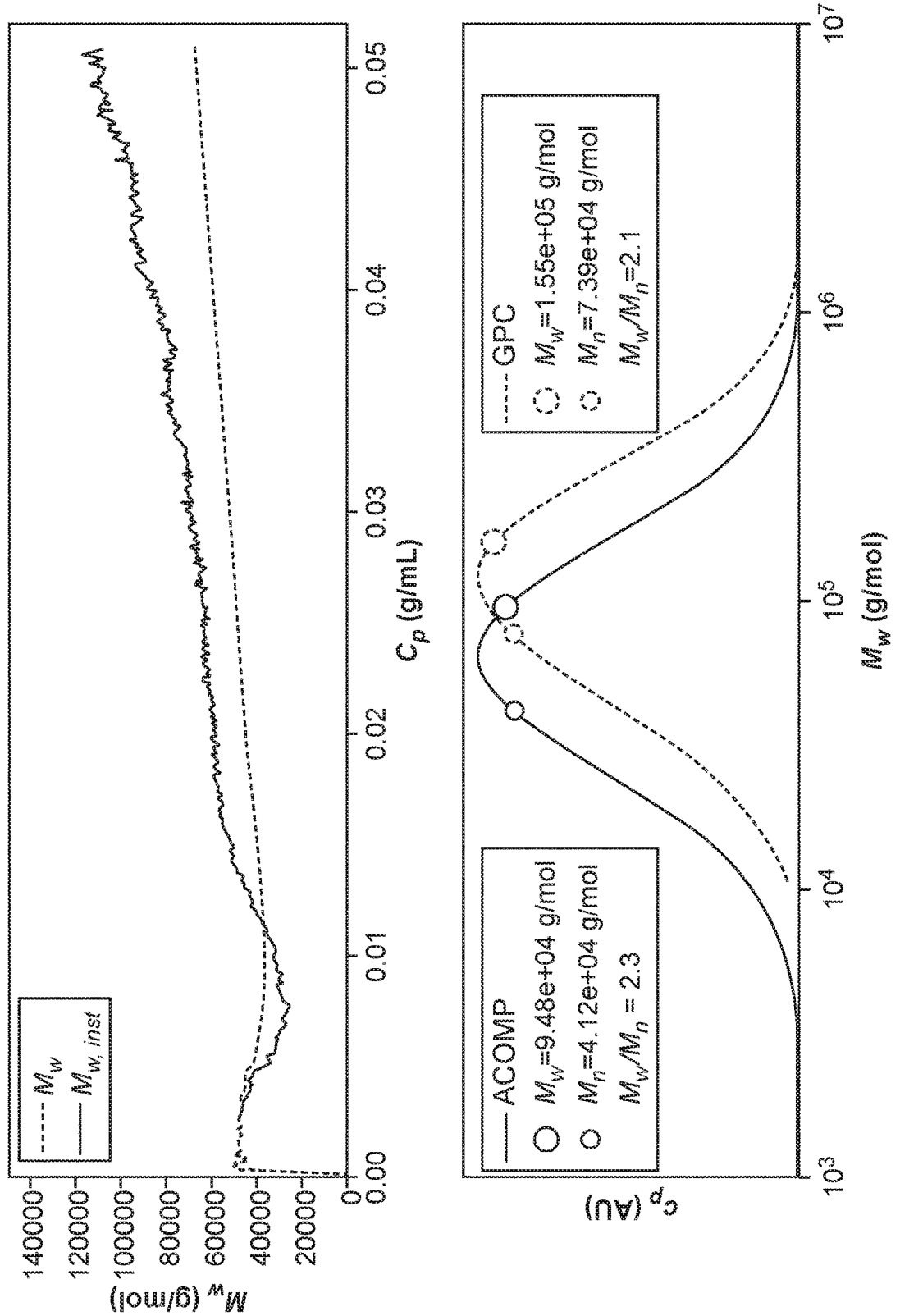
FIG. 27 illustrates $M_w$ and $M_{w,inst}$ as a function of total polymer concentration, according to an example embodiment of the present disclosure.

FIG. 27 shows the $M_w$ and $M_{w,inst}$ as a function of total polymer concentration. At bottom is a comparison of the MWD produced by ACOMP and GPC. The $M_w$ provided by ACOMP is 95,000 g/mol compared to the erroneously high $M_w$ from GPC of 155,000 g/mol, due to the reasons just stated. The difference in reduced viscosity of the copolymer and the PEO standards highlights an advantage that the separation-free molecular weight distribution has, namely that it is not dependent on a standard calibration that ignores differences in important variables like reduced viscosity.

Real-Time Molecular Weight Distributions

APMT can display the evolution of polymer properties like $M_w$ and the MWD in real time. A new MWD is plotted after a threshold of polymer concentration $\Delta c_p$ is produced. The layering of the distributions provides a way to see the evolution of the MWD through time.

Figure 28:
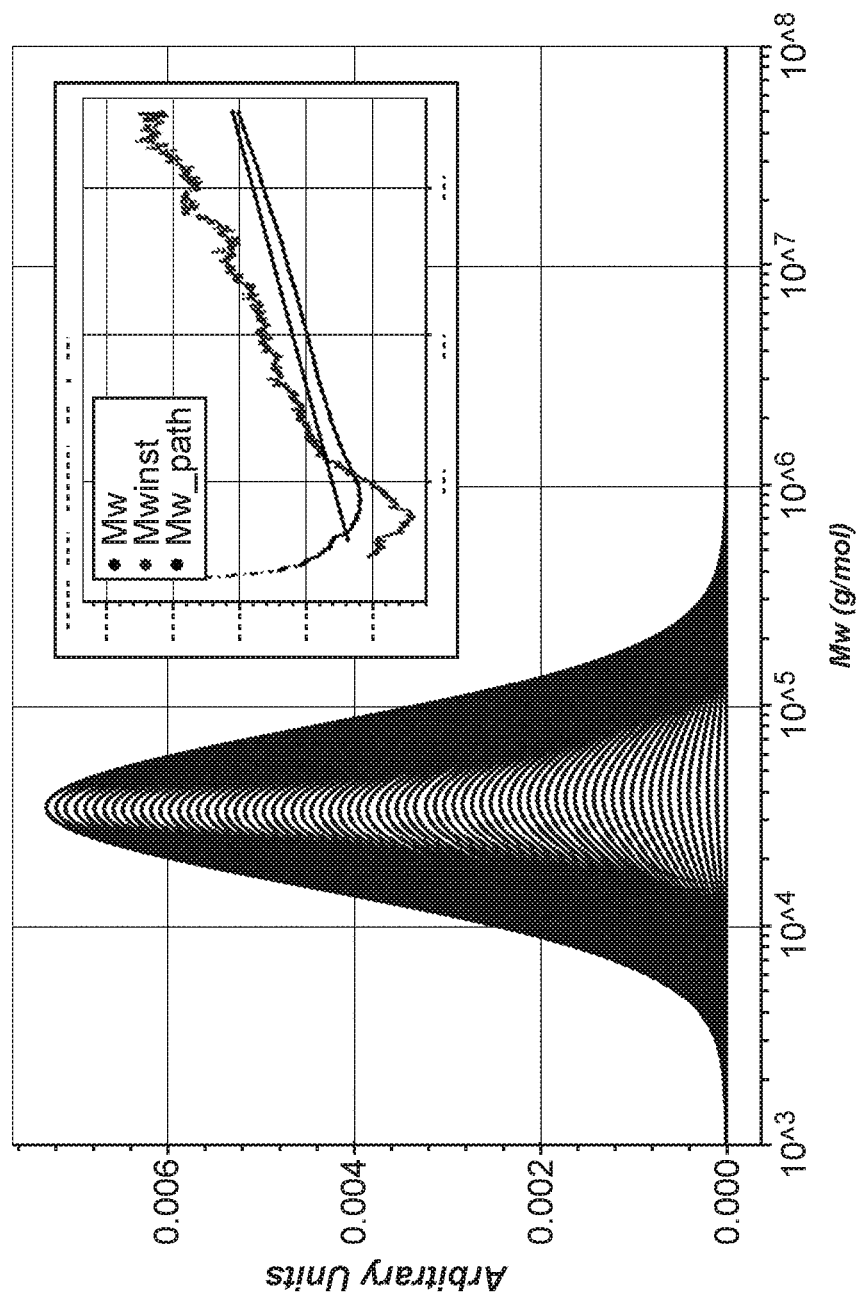
FIG. 28 illustrates a graphical display output of software capable of monitoring polymer properties, including the development of the molecular weight distribution, in real time, according to an example embodiment of the present disclosure.

FIG. 28 illustrates a graphical display output of software capable of monitoring polymer properties, including the development of the molecular weight distribution, in real time. The inset shows the $M_w$ control path that ACOMP is using to steer the reaction. Also shown are the measured values of $M_w$ and $M_{w,inst}$.

Improved Method for Computing $M_{w,inst}$

This section details an implementation of generating molecular weight distributions in real time using the instantaneous molecular weight $M_{w,inst}$ in chain growth free radical polymerization reactions.

The weight-average molecular weight of a polymer in solution is obtained from a combination of an ultraviolet absorption detector and a multiangle light scattering detector. The concentration of solutes is determined by the UV detector. Those concentrations and the angular dependence of the scattered light provide the information necessary to determine the weight-average molecular weight of the solutes.

Signal Processing

The raw signals from the detectors are filtered using a rolling median followed by a rolling mean. Typical values are 21 seconds and 30 seconds, respectively. For both the rolling median and the rolling mean, any data points that lie three standard deviations outside of the median are rejected as outliers. The median was chosen as the anchor for outlier rejection because it is more robust to outliers than the mean.

In more explicit detail, there are three buffers of data: raw, rollingMedian, and rollingMean. When a new datum is measured, it is added to the raw buffer. The outlier-rejected median of the most recent 21 data points in the raw buffer is chosen as the new datum in the rollingMedian buffer. The outlier-rejected mean of the most recent 30 data points in the rollingMedian buffer is chosen as the new datum in the rollingMean buffer. Data from this last buffer is propagated through to the remaining calculations.

If necessary, a five-minute rolling mean may be applied to $M_{w,inst}$ to further increase precision, at the expense of accuracy.

$M_{w,inst}$ Calculation

The computation of $M_{w,inst}$ has been used many times but is re-stated here for completeness. $M_w$ is obtained in the usual way from the Zimm Equation $$\frac{Kc_p}{I(\theta)} = \frac{1}{M_w}\left(1 + \frac{q^2 <S^2>_z}{3}\right) + 2A_2c_p \quad (44)$$

where $c_p$ is the polymer concentration, $I(\theta)$ is the Rayleigh scattering ratio of scattered light at different angles ($\theta$), $<S^2>_z$ is the z-averaged mean square radius of gyration, $A_2$ is the second Virial coefficient, and the optical constant K is given for vertically polarized incident light by $$K = 4\pi^2 n_0 (dn/dc)^2/(N_A \lambda^4) \quad (45)$$

where $n_0$ is the index of refraction of the solution, dn/dc is the refractive index increment, $\lambda$ is the wavelength of light used in the scattering detector, and $N_A$ is Avogadro's constant. According to standard procedures, the extrapolation to zero angle yields a line whose slope against $c_p$ is $2A_2$ and whose y-intercept is $1/M_w$. Extrapolation to zero concentration yields a line whose slope against $q^2$ is $<S^2>/3$ and whose intercept is $1/M_w$. In ACOMP practice $A_2$ is determined independently in a separate experiment and then substituted into the Zimm equation, which, together with the continuous ACOMP extrapolation of $Kc_p/I(\theta)$ to $\theta=0$, $Kc_p/I(0)$ directly yields $M_w$; i.e.

$$M_w = \frac{1}{c_p\left(\frac{L}{I(\theta)} - 2A_2\right)} \quad (46)$$

Instantaneous weight-average molecular weight $M_{w,inst}$ is then computed in the usual way by equation 1. It is noted that the numerator in equation 1 automatically becomes independent of $c_p$ but the derivative is still with respect to $c_p$, so that error in both I(0) and $c_p$ are propagated into $M_{w,inst}$.

Improved Derivative Calculation

The measured value from the analog output of a detector is comprised of the true value of the signal and some measurement error.

The time derivative of $V_m$ is equal to the derivative of both components, $$\frac{dV_m}{dt} = \frac{dV_{true}}{dt} + \frac{dV_{error}}{dt} \quad (47)$$

It is crucial to minimize the effect that the error introduces into the derivative. The method proposed is as follows. Approximate the derivative by calculating the slope over a finite time interval $\Delta t$. Let $\Delta t$ be a time large enough that there is a measurable change in $V_{true}$ and small enough to maintain an accurate representation of the dynamics of the system. Let $\tau$ be a much shorter time that will be used to reduce error in the endpoints by taking the mean of $V_m$. The change in $\Delta V_m$ over $\Delta t$ then is, $$\frac{\Delta V_m}{\Delta t} \approx \frac{\overline{V_m(t-\tau, ..., t)} - \overline{V_m(t-\Delta t, ..., t-\Delta t+\tau)}}{\Delta t - \tau} \quad (48)$$

With this reduction in error, the calculated change in the measured variable is closer to the change in the true variable, $$\frac{\Delta V_m}{\Delta t} \approx \frac{dV_m}{dt} \approx \frac{dV_{true}}{dt} \quad (49)$$

Typical values are $\Delta t=5$ min and t=30.

Figure 29:
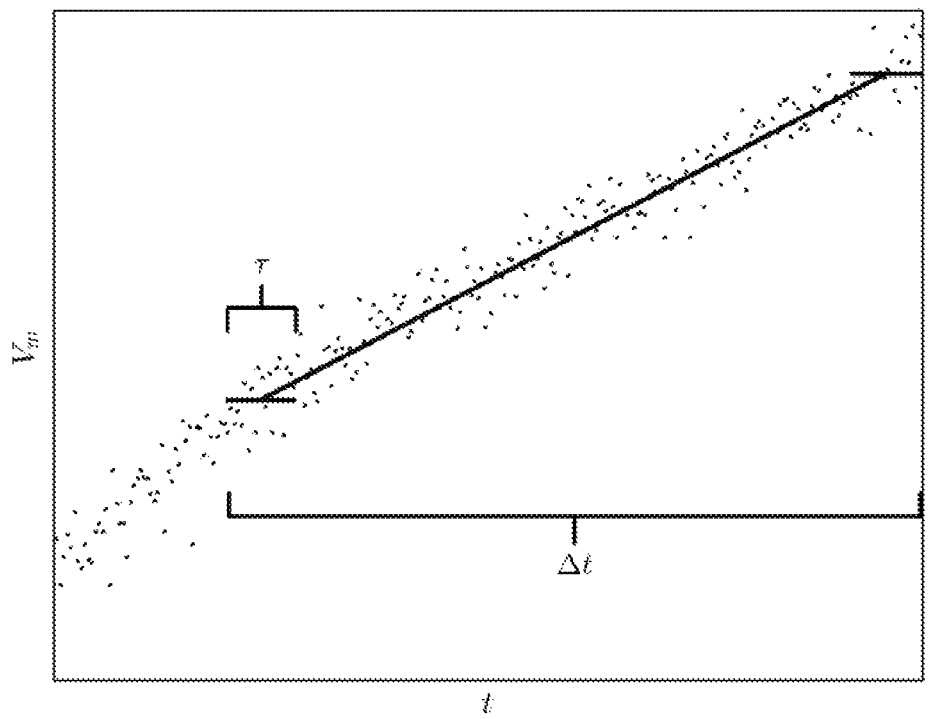
FIG. 29 illustrates a derivative algorithm to reduce measurement noise, according to an example embodiment of the present disclosure.

FIG. 29 shows the derivative algorithm to reduce measurement noise. A window of $\tau$ seconds of data is averaged at the endpoints. The slope of $V_m$ vs. t is then calculated over the window ($\Delta t - \tau$).

Similarly, the derivative to compute $M_{w,inst}$ can be approximated as $$M_{w,inst} = \quad (50)$$
$$\frac{d(c_p M_w)}{dc_p} \approx \frac{\overline{(c_p M_w)(t-\tau, ..., t)} - \overline{(c_p M_w)(t-\Delta t, ..., t-\Delta t+\tau)}}{\overline{c_p(t-\tau, ..., t)} - \overline{c_p(t-\Delta t, ..., t-\Delta t+\tau)}}$$

Cumulative Molecular Weight Distribution

The progress of the reaction is tracked by the increase in polymer concentration $c_p$. Let $\Delta c_p$ be the change in polymer concentration necessary before the current value of $M_{w,inst}$ can be folded into a distribution representing the polymers being created at that moment. A typical value is $\Delta_{cp}=0.001$ g/mL.

While many distributions can be argued for, the log normal distribution is used here for its versatility. An instantaneous molecular weight distribution IMWD, using the log normal distribution is, $$IMWD(M) = A\exp\left(-\frac{\log(M/M_{w,inst})^2}{2\sigma^2}\right) \quad (51)$$

where M is a range of molecular weights from $10^3$ g/mol to $10^8$ g/mol, A is a normalization constant, and $\sigma$ is the standard deviation of the distribution. The standard deviation is determined by the polydispersity of the instantaneous distribution, $$\sigma = \sqrt{\log(M_w/M_n)} \quad (52)$$

where a typical polydispersity might be $M_w/M_n=2.0$.

The cumulative molecular weight distribution CMWD is a linear combination of the IMWDs, where each is scaled by the $\Delta c_p$ accumulated for that particular $M_{w,inst}$, $$\text{CMWD} = \Sigma(\Delta c_p)_i \text{IMWD}_i. \quad (53)$$

Statements of the Disclosure Include:

Statement 1: A method comprising: measuring an instantaneous average property of polymers being produced by a polymerization reaction occurring in a reaction vessel a plurality of times during the polymerization reaction; determining a corresponding change in polymer concentration in the reaction vessel based at least in part on successive measurements of the instantaneous average property of the polymers; computing an instantaneous distribution of the polymer property corresponding to the most recently measured instantaneous average property using a statistical distribution; and adding together the instantaneous distributions of the polymer with their amplitude proportional to the change in polymer concentration between successive values of instantaneous average polymer property, in order to obtain the cumulative distribution of the polymer population in the reactor up to the latest measured value of the instantaneous average polymer property and change in polymer concentration.

Statement 2: A method according to Statement 1, wherein the instantaneous average property measurements are obtained using an ACOMP system.

Statement 3: A method according to Statement 1 or Statement 2, further comprising the use of the instantaneous and cumulative polymer property distributions to monitor a polymerization reaction.

Statement 4: A method according to any one of the preceding Statements 1-3, further comprising the use of the instantaneous and cumulative polymer property distributions to control a polymerization reaction.

Statement 5: A method according to any one of the preceding Statements 1-4, further comprising the use of the cumulative polymer property distribution to provide analytical characterization of the final polymer product.

Statement 6: A method according to any one of the preceding Statements 1-5, wherein the property of the polymers is selected from the group consisting of: molecular weight, intrinsic viscosity, and comonomer composition.

Statement 7: A method comprising: measuring an instantaneous weight average molecular weight of polymers being produced by a polymerization reaction occurring in a reaction vessel a plurality of times during the polymerization reaction; determining a corresponding change in polymer concentration in the reaction vessel based at least in part on successive measurements of the instantaneous weight average molecular weight; computing a histogram of the cumulative molecular weight average, with their amplitude proportional to the change in polymer concentration between successive measurements of instantaneous weight average molecular weight; and computing a full and continuous molecular weight distribution based on the histogram using a statistical distribution appropriate to the polymerization reaction.

Statement 8: A method according to Statement 7, wherein measuring the instantaneous weight average molecular weight comprises minimizing the effect of measurement noise in the analog output signal using a derivative algorithm.

Statement 9: A method according to Statement 7, wherein the derivative algorithm comprises computing instantaneous weight average molecular weight, $M_{w,inst}$, according to:

$$M_{w,inst} = \frac{d(c_p M_w)}{dc_p} \approx \frac{\overline{(c_p M_w)(t-\tau, \ldots, t)} - \overline{(c_p M_w)(t-\Delta t, \ldots, t-\Delta t+\tau)}}{\overline{c_p(t-\tau, \ldots, t)} - \overline{c_p(t-\Delta t, \ldots, t-\Delta t+\tau)}}.$$

Statement 10: A device comprising: a means of measuring an instantaneous property of the polymers being produced in a reaction vessel a plurality of times during a polymerization reaction; a means of determining the corresponding change in polymer concentration in the reaction vessel between measurements of the instantaneous polymer property; a means of computing a statistical distribution appropriate to the polymer characteristic and applying the statistical distribution to a recently measured instantaneous value of the polymer property so as to have an instantaneous distribution of the polymer property; and a means of adding together the instantaneous distributions of the polymer property in order to obtain the cumulative distribution of the polymer property in the reactor.

Statement 11: A device according to Statement 10, further comprising: a means of measuring instantaneous weight average molecular weight of the polymers being produced in a reaction vessel a plurality of times during a polymerization reaction; a means of measuring the corresponding change in polymer concentration in the reaction vessel between measurements of the instantaneous weight average molecular weight; a means of computing an instantaneous molecular weight distribution corresponding to a recently reported instantaneous weight average molecular weight a means of adding together the instantaneous molecular weight distributions in order to obtain the cumulative molecular weight distribution of the polymer population in the reaction vessel.

Statement 12: A device according to Statement 10 or Statement 11, wherein the device comprises an ACOMP system.

Statement 13: A device according to any one of the preceding Statements 10-12, wherein the obtained cumulative molecular weight distributions are used to control the polymerization reaction.

Statement 14: A system comprising: a reactor configured to contain at least one polymer undergoing a polymerization reaction; a measuring device coupled with the reactor, the measuring device configured to measure an instantaneous average property of at least one polymer in the reactor; and a computational device coupled with the measuring device, the computational device configured to compute a computational output based on the instantaneous average property received from the measuring device, wherein the computational output is a distribution corresponding to the instantaneous average property.

Statement 15: A system according to Statement 14, wherein the measuring device is an ACOMP system.

Statement 16: A system according to Statement 14 or Statement 15, further comprising a controller communicatively coupled with the computational device and further coupled with the reactor, the controller configured to manipulate at least one reactor control variable based on computational output received from the computational device.

Statement 17: A system according to Statement 16, wherein the reactor control variable comprises at least one selected from the group consisting of mixing rate, temperature, rate of flow of reagents from external reservoirs into the reactor, and the input of radiation into the reactor.

Statement 18: A system according to Statement 17, wherein the reagents from external reservoirs comprises at least one selected from the group consisting of monomers, comonomers, initiators, chain transfer agents, branching agents, crosslinking agents, quenchers, catalysts, and gases, such as oxygen, nitrogen, and air.

Statement 19: A system according to any one of the preceding Statements 14-18, wherein the instantaneous average property comprises at least one selected from the group consisting of comonomer composition, the weight average molecular weight $M_w$, and the weight average reduced viscosity $\eta_{w,r}$.

We claim:

1. A method comprising:
    monitoring an instantaneous average property of polymers-being produced by a polymerization reaction occurring in a reaction vessel a plurality of times during the polymerization reaction;
    determining a corresponding change in polymer concentration in the reaction vessel based at least in part on successive values of the instantaneous average property of the polymers;
    computing an instantaneous polymer property distribution corresponding to the most recently instantaneous average property using a statistical distribution; and
    adding together the instantaneous polymer property distributions with their amplitude proportional to the change in polymer concentration between successive values of instantaneous average polymer property, in order to obtain a cumulative polymer property distribution up to the latest value of the instantaneous average polymer property and change in polymer concentration; and
    wherein the cumulative polymer property distribution is determined without physically separating the polymers.

2. The method according to claim 1, wherein the instantaneous average property is obtained using an ACOMP system.

3. The method according to claim 1, further comprising the use of the instantaneous polymer property distribution and cumulative polymer property distribution to monitor a polymerization reaction.

4. The method according to claim 1, further comprising the use of the instantaneous polymer property distribution and cumulative polymer property distribution to control a polymerization reaction.

5. The method according to claim 1, further comprising the use of the cumulative polymer property distribution to provide analytical characterization of the final polymer product.

6. The method according to claim 1, wherein the property of the polymers is selected from the group consisting of: molecular weight, intrinsic viscosity, and comonomer composition.

7. A method comprising:
    monitoring an instantaneous-weight average molecular weight ($M_{w,inst}$) of polymers being produced by a polymerization reaction occurring in a reaction vessel a plurality of times during the polymerization reaction;
    determining a corresponding change in polymer concentration $\Delta C_p$ in the reaction vessel based at least in part on successive values measurements of the instantaneous weight average molecular weight;
    generating an instantaneous molecular weight distribution (IMWD) at the change in the polymer concentration $\Delta C_p$ by using the instantaneous weight average molecular weight as the mean for the IMWD;
    computing a histogram of instantaneous weight average molecular weight distributions (IMWDs), with the amplitude of the IMWDs proportional to the change in polymer concentration between successive values of instantaneous weight average molecular weight; and
    computing a cumulative molecular weight distribution (CMWD) based on the histogram using a statistical distribution appropriate to the polymerization reaction;
    wherein the cumulative molecular weight distribution is determined without physically separating the polymer population.

8. The method according to claim 7, wherein monitoring the instantaneous weight average molecular weight comprises minimizing the effect of measurement noise in the analog output signal using a derivative algorithm.

9. The method according to claim 8, wherein the derivative algorithm comprises computing instantaneous weight average molecular weight, $M_{w,inst}$, according to:

$$M_{w,inst} = \frac{d(c_p M_w)}{dc_p} \approx \frac{\overline{(c_p M_w)(t-\tau, ..., t)} - \overline{(c_p M_w)(t-\Delta t, ..., t-\Delta t+\tau)}}{\overline{c_p(t-\tau, ..., t)} - \overline{c_p(t-\Delta t, ..., t-\Delta t+\tau)}}.$$

10. A device comprising:
    a means of monitoring an instantaneous weight average molecular weight of polymers being produced in a reaction vessel a plurality of times during a polymerization reaction;
    a means of determining the corresponding change in polymer concentration in the reaction vessel between values of the instantaneous weight average molecular weight;
    a means of computing an instantaneous molecular weight distribution corresponding to a recently instantaneous weight average molecular weight and applying the statistical distribution to a recent value of the polymer property to obtain the instantaneous molecular weight distribution of the polymer property; and
    a means of adding together each instantaneous molecular weight distribution of the polymer property to obtain a cumulative molecular weight distribution, wherein each instantaneous weight average molecular weight that is added is weighted by the polymer concentration interval produced since the previous instantaneous weight average molecular weight,
    wherein the cumulative molecular weight distribution is determined without physically separating the polymers.

11. The device according to claim 10, wherein the device comprises an ACOMP system.

12. The device according to claim 10, wherein the obtained cumulative molecular weight distributions are used to control the polymerization reaction.

13. A system comprising:
    a reactor configured to contain at least one polymer produced by a polymerization reaction;
    a measuring device coupled with the reactor, the measuring device configured to monitor an instantaneous average property of the at least one polymer in the reactor; and a computational device coupled with the measuring device, the computational device configured to compute a cumulative polymer property distribution based on the instantaneous average property; and a controller communicatively coupled with the computational device and further coupled with the reactor, the controller configured to manipulate at least one reactor control variable based on the cumulative polymer property distribution to obtain a predetermined, final cumulative polymer property distribution for the end product, wherein the cumulative polymer property distribution is determined without physically separating the at least one polymer.

14. The system according to claim 13, wherein the measuring device is an ACOMP system.

15. The system according to claim 13, wherein the reactor control variable comprises at least one selected from the group consisting of mixing rate, temperature, rate of flow of reagents from external reservoirs into the reactor, and the input of radiation into the reactor.

16. The system of claim 15, wherein the reagents from external reservoirs comprises at least one selected from the group consisting of monomers, comonomers, initiators, chain transfer agents, branching agents, crosslinking agents, quenchers, catalysts, and gases, such as oxygen, nitrogen, and air.

17. The system according to claim 13, wherein the instantaneous average property comprises at least one selected from the group consisting of comonomer composition, the weight average molecular weight $M_w$, and the weight average reduced viscosity $\eta_{w,r}$.

18. The method according to claim 1 further comprising controlling the polymerization reaction based on the cumulative polymer property distribution to obtain a predetermined, final cumulative polymer property distribution for the end product.

19. The method according to claim 7, wherein the monitoring an instantaneous weight average molecular weight of polymers being produced by a polymerization reaction occurring in a reaction vessel a plurality of times during the polymerization reaction comprises measuring polymer concentration ($C_p$) and cumulative weight average molecular weight ($M_w$) of polymers being produced by a polymerization reaction occurring in a reaction vessel a plurality of times during the polymerization reaction.

20. The method according to claim 7, wherein the determining a corresponding change in polymer concentration $\Delta C_p$ in the reaction vessel based at least in part on successive values of the instantaneous weight average molecular weight comprises:

determining a corresponding change in polymer concentration in the reaction vessel based at least in part on successive measurements of the cumulative weight average molecular weight; and deriving the instantaneous molecular weight ($M_{w,inst}$) based upon the measured $M_w$ and $C_p$.

21. The method according to claim 1, wherein the monitoring an instantaneous average property of polymers being produced by a polymerization reaction occurring in a reaction vessel a plurality of times during the polymerization reaction comprises:

measuring polymer concentration and a cumulative average property of polymers being produced by a polymerization reaction occurring in a reaction vessel a plurality of times during the polymerization reaction; and deriving the instantaneous average property of polymers based upon the measured cumulative average property and polymer concentration.

22. The method according to claim 7, wherein the histogram of IMWDs comprises polymer concentration $C_p$ versus $M_{w,inst}$.

* * * * *